US009281757B2

(12) United States Patent
Naito et al.

(10) Patent No.: US 9,281,757 B2
(45) Date of Patent: Mar. 8, 2016

(54) VOLTAGE CONVERSION DEVICE AND ELECTRICAL LOAD DRIVING DEVICE

(75) Inventors: Takayuki Naito, Okazaki (JP); Akihiko Nojima, Toyota (JP); Takashi Imai, Okazaki (JP); Nobuyuki Ishihara, Okazaki (JP); Junzo Ooe, Miyoshi (JP); Koichi Mizutani, Toyota (JP); Masaru Inada, Okazaki (JP); Kouichi Yamanoue, Hiroshima (JP); Shigeki Yamamoto, Hiroshima (JP)

(73) Assignees: TOYOTA JIDOSHA KABUSHIKI KAISHA, Toyota (JP); VISTEON GLOBAL TECHNOLOGIES, INC., Van Buren Township, MI (US)

( * ) Notice: Subject to any disclaimer, the term of this patent is extended or adjusted under 35 U.S.C. 154(b) by 1266 days.

(21) Appl. No.: 13/140,998

(22) PCT Filed: Dec. 17, 2009

(86) PCT No.: PCT/IB2009/007799
§ 371 (c)(1),
(2), (4) Date: Jul. 8, 2011

(87) PCT Pub. No.: WO2010/070431
PCT Pub. Date: Jun. 24, 2010

(65) Prior Publication Data
US 2011/0273014 A1    Nov. 10, 2011

(30) Foreign Application Priority Data

Dec. 18, 2008  (JP) .................................. 2008-322477
Dec. 19, 2008  (JP) .................................. 2008-324717

(51) Int. Cl.
*H02M 1/44*    (2007.01)
*H02M 7/00*    (2006.01)

(52) U.S. Cl.
CPC ................ *H02M 7/003* (2013.01); *H02M 1/44* (2013.01); *Y10T 307/50* (2015.04)

(58) Field of Classification Search
CPC ...... H02M 1/44; H02M 7/003; Y10T 307/50; H02J 1/10
USPC ......... 361/152, 156, 204, 748, 760, 763, 783; 307/115, 109, 98
See application file for complete search history.

(56) References Cited

U.S. PATENT DOCUMENTS 5,844,786 A * 12/1998 Yoshida ................ H02M 3/155
                                                            323/222
2002/0051372 A1* 5/2002 Hoshino et al. .................. 363/60
(Continued)

FOREIGN PATENT DOCUMENTS

EP    0 743 744 A2    11/1996
JP    A-62-5695        1/1987
(Continued)

OTHER PUBLICATIONS

International Search Report for International Patent Application No. PCT/IB2009/007799, mailed on May 20, 2010.
(Continued)

*Primary Examiner* — Fred E Finch, III
*Assistant Examiner* — Gustavo Rosario Benitez
(74) *Attorney, Agent, or Firm* — Oliff PLC

(57) ABSTRACT

A voltage conversion device includes: first and second loop circuits having a common inductance element. Electric current alternately flows through the first or second loop circuit as a first switching element of the first loop circuit is turned on or off. A magnetic field that is formed when the first switching element is turned on and that penetrates through the first loop circuit and a magnetic field that is formed when the first switching element is turned off after it is turned on and that penetrates through the second loop circuit have the same direction. All elements that constitute the first and second loop circuits are arranged on the same surface of a substrate. The second loop circuit is connected to a second direct-current power source. The first loop circuit is connected to a first direct-current power source.

31 Claims, 22 Drawing Sheets

(56) References Cited

U.S. PATENT DOCUMENTS

| | | | |
|---|---|---|---|
| 2005/0057445 A1* | 3/2005 | Bezal et al. | 345/60 |
| 2007/0230987 A1* | 10/2007 | Yamashita | 399/88 |
| 2009/0201005 A1* | 8/2009 | Noma et al. | 323/311 |
| 2010/0052424 A1* | 3/2010 | Taylor et al. | 307/45 |
| 2011/0148370 A1* | 6/2011 | Mizutani et al. | 323/271 |

FOREIGN PATENT DOCUMENTS

| | | |
|---|---|---|
| JP | A-4-69060 | 3/1992 |
| JP | A-2000-287454 | 10/2000 |
| JP | A-2002-171748 | 6/2002 |
| JP | A-2002-204567 | 7/2002 |
| JP | A-2003-48560 | 2/2003 |
| JP | A-2004-15895 | 1/2004 |
| JP | A-2005-110452 | 4/2005 |
| JP | A-2006-42443 | 2/2006 |
| JP | A-2007-274759 | 10/2007 |
| WO | WO 2010/029917 A1 | 3/2010 |

OTHER PUBLICATIONS

Written Opinion for International Patent Application No. PCT/IB2009/007799, mailed on May 20, 2010.

* cited by examiner

F I G . 5
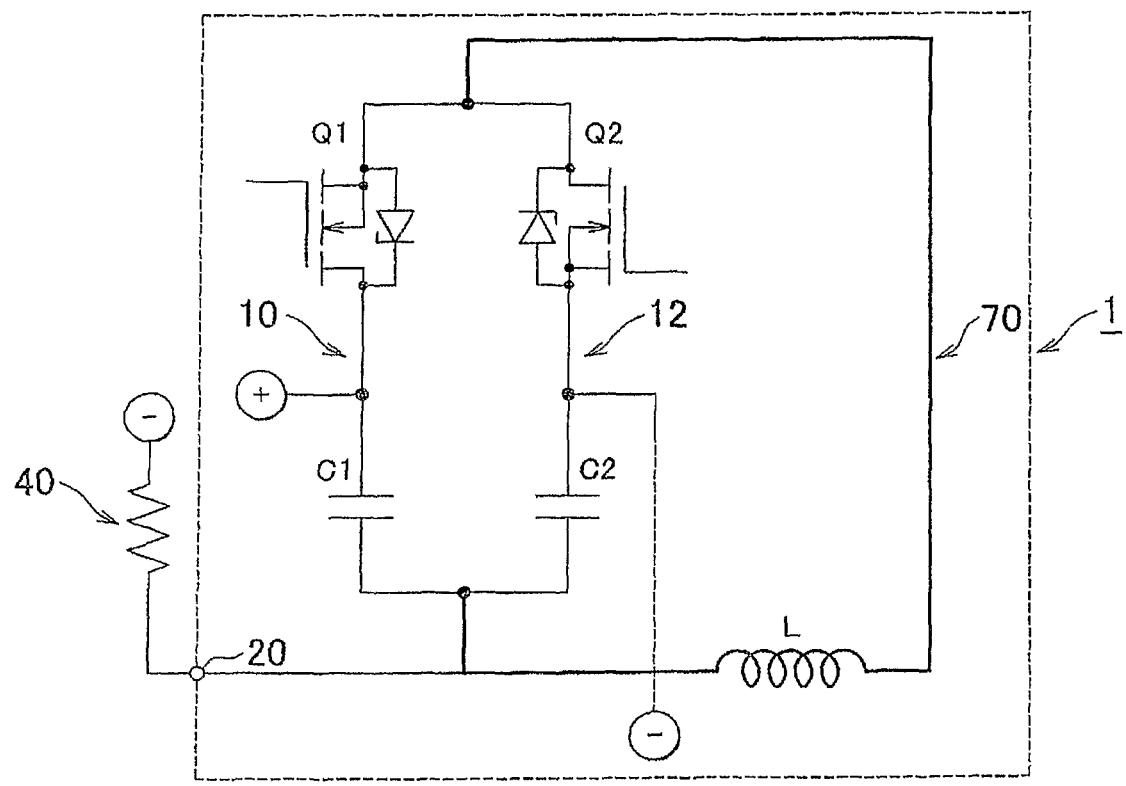

FIG. 6A  I2
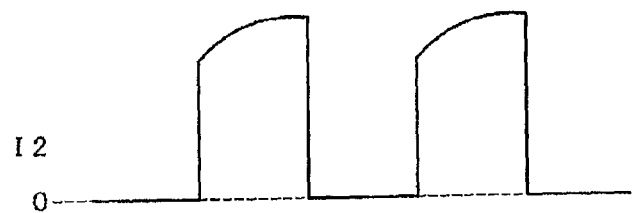
FIG. 6B  I1
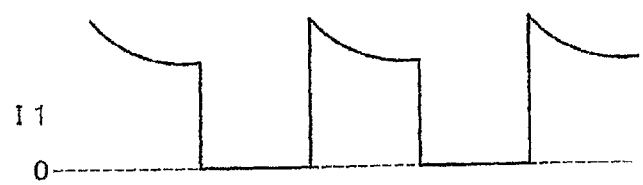
FIG. 6C  φ2
FIG. 6D  φ1
FIG. 6E  φ2+φ1

F I G . 7A
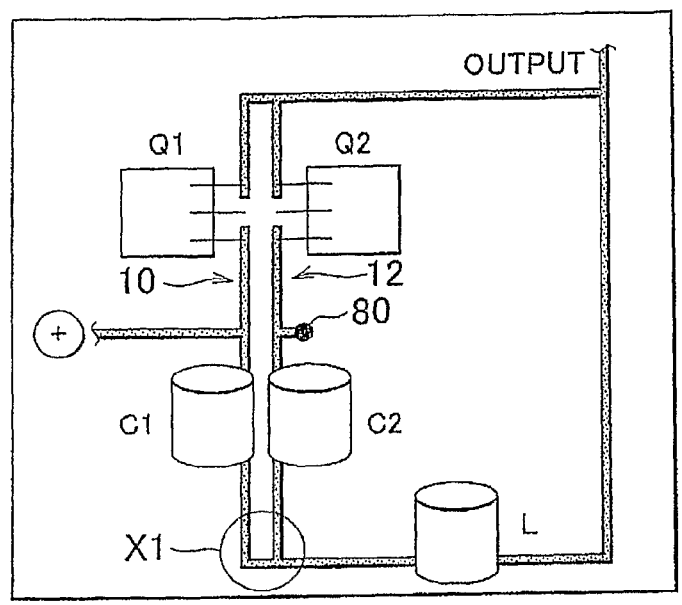
F I G . 7B
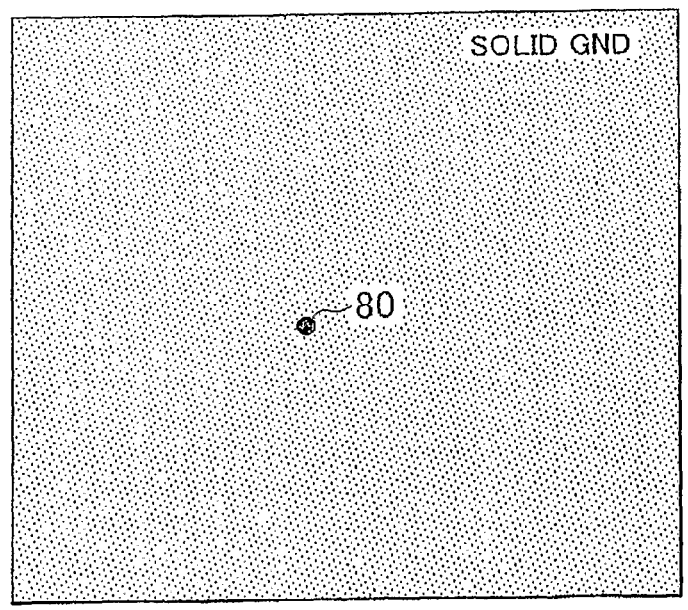

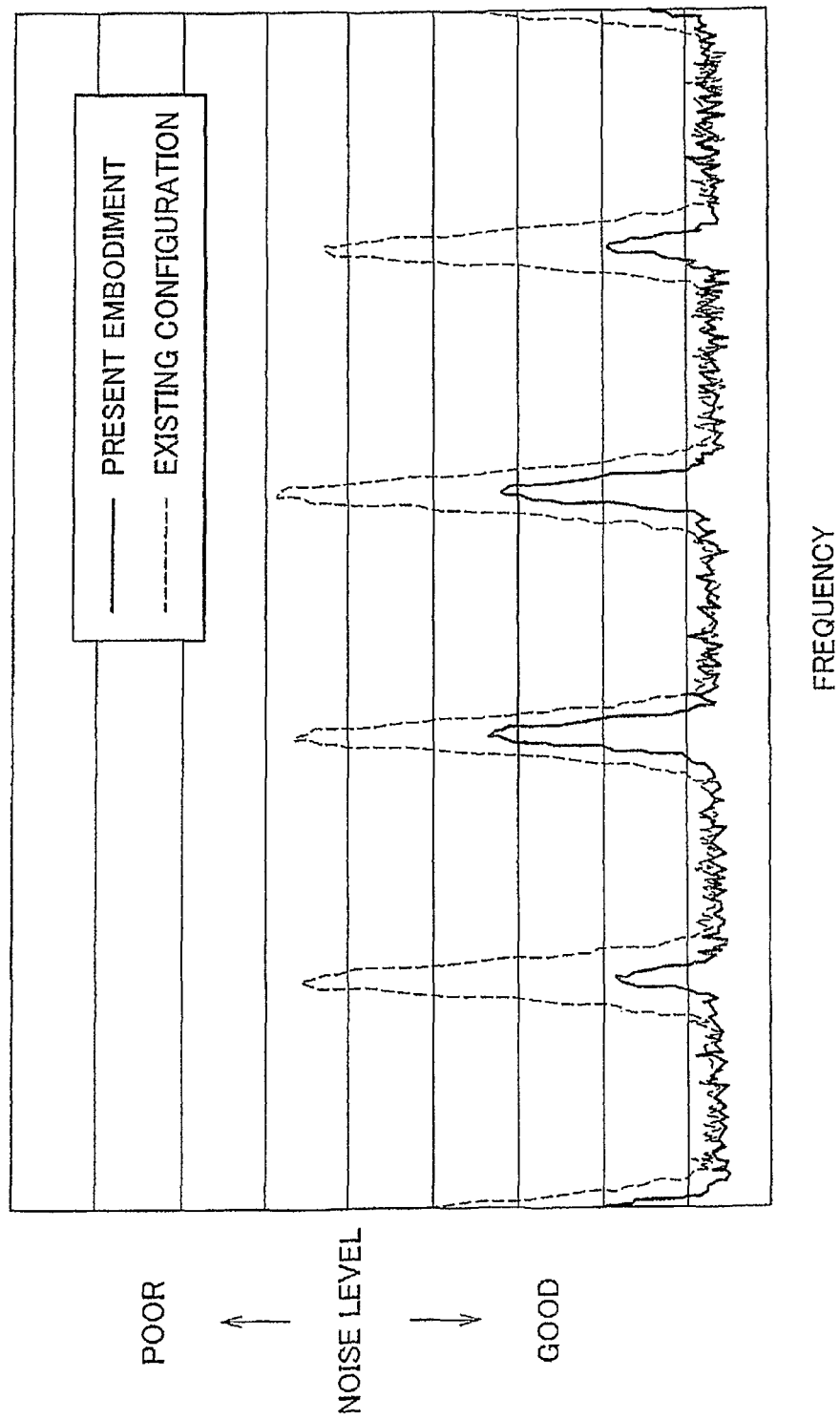

VOLTAGE CONVERSION DEVICE AND ELECTRICAL LOAD DRIVING DEVICE

BACKGROUND OF THE INVENTION

1. Field of the Invention

The invention relates to a voltage conversion device that includes a first loop circuit and a second loop circuit that share an inductance component, and an electrical load driving device using the voltage conversion device.

2. Description of the Related Art

An existing switching power supply circuit includes a primary circuit connected to a primary coil of a transformer and a secondary circuit connected to a secondary coil of the transformer. In the switching power supply circuit, an electrode pattern at the primary circuit side and an electrode pattern at the secondary circuit side are arranged to face each other. By so doing, an insulating layer between the electrode patterns functions as a dielectric substance for a capacitor to constitute an equivalent capacitor. The equivalent capacitor constitutes a capacitor for measures against noise (see, for example, Japanese Patent Application Publication No. 2005-110452 (JP-A-2005-110452)).

Incidentally, for example, as shown in FIG. 1, a non-insulated DC-DC converter that does not use a transformer includes a first loop circuit and a second loop circuit. The first loop circuit and the second loop circuit share an inductance L and respectively have capacitors C1 and C2. A switching element Q1 provided for the first loop circuit or a switching element Q2 provided for the second loop circuit are turned on or off to implement voltage conversion. At this time, a first capacitor and a second capacitor have the function of smoothing the output voltage of the DC-DC converter and reducing noise generated in the DC-DC converter circuit. Such a circuit configuration shown in FIG. 1 is generally implemented in such a manner that the first loop circuit and the second loop circuit are arranged on a printed board in the same plane or in different planes as shown in FIG. 2.

However, in the existing circuit configuration shown in FIG. 1 and FIG. 2, for example, when the switching element Q1 is turned on or off, electric current alternately flows to the first loop circuit and the second loop circuit. Thus, a magnetic field that penetrates through the first loop circuit and a magnetic field that penetrates through the second loop circuit are alternately generated. At this time, the directions of the respective electric currents that flow through the first loop circuit and the second loop circuit are opposite as indicated by the arrows in FIG. 1. Thus, the direction of the magnetic field that penetrates through the first loop circuit and the direction of the magnetic field that penetrates through the second loop circuit are opposite. In the above configuration, there is a problem that as the switching element Q1 is turned on or off at high speed (in a short period of time), the magnetic fields having opposite directions are alternately generated at high speed (in a short period of time) and, therefore, noise due to fluctuations in the magnetic fields occurs.

SUMMARY OF THE INVENTION

The invention provides a voltage conversion device that effectively reduces noise due to fluctuations in magnetic fields formed in a first loop circuit and a second loop circuit, and an electrical load driving device using the voltage conversion device.

A first aspect of the invention provides a voltage conversion device. The voltage conversion device includes: a first loop circuit that includes a first switching element; and a second loop circuit, wherein the first loop circuit and the second loop circuit include a common inductance element, wherein electric current alternately flows through the first loop circuit or the second loop circuit as the first switching element is turned on or off, a magnetic field that is formed when the first switching element is turned on and that penetrates through the first loop circuit and a magnetic field that is formed when the first switching element is turned off after the first switching element is turned on and that penetrates through the second loop circuit have the same direction, all elements that constitute the first loop circuit and the second loop circuit are arranged on the same surface of a substrate, and the second loop circuit is connected to a second direct-current power source, and the first loop circuit is connected to a first direct-current power source that has a voltage different from a voltage of the second direct-current power source.

The first loop circuit may be, for example, connected to the first direct-current power source at an opposite side (that is, a side on which no elements that constitute the first loop circuit and the second loop circuit are arranged) of the substrate via a through hole that extends through the substrate. For example, a chip jumper may be used to connect the first loop circuit to the first direct-current power source on the same surface side (that is, a side on which all the elements that constitute the first loop circuit and the second loop circuit are arranged).

A second aspect of the invention provides a voltage conversion device. The voltage conversion device includes: a first loop circuit that includes a first switching element; and a second loop circuit, wherein the first loop circuit and the second loop circuit include a common inductance element, wherein electric current alternately flows through the first loop circuit or the second loop circuit as the first switching element is turned on or off, a magnetic field that is formed when the first switching element is turned on and that penetrates through the first loop circuit and a magnetic field that is formed when the first switching element is turned off after the first switching element is turned on and that penetrates through the second loop circuit have the same direction, and the area of an overlapped portion between a portion surrounded by the first loop circuit and a portion surrounded by the second loop circuit is larger than or equal to the area of a non-overlapped portion within the portion surrounded by the first loop circuit or the portion surrounded by the second loop circuit.

A third aspect of the invention provides a voltage conversion device. The voltage conversion device includes: a first loop circuit that includes a first switching element; and a second loop circuit, wherein the first loop circuit and the second loop circuit include a common inductance element, wherein electric current alternately flows through the first loop circuit or the second loop circuit as the first switching element is turned on or off, a magnetic field that is formed when the first switching element is turned on and that penetrates through the first loop circuit and a magnetic field that is formed when the first switching element is turned off after the first switching element is turned on and that penetrates through the second loop circuit have the same direction, and a magnetic substance is arranged within an overlapped portion between a portion surrounded by the first loop circuit and a portion surrounded by the second loop circuit.

A fourth aspect of the invention provides a voltage conversion device. The voltage conversion device includes: a first loop circuit that includes a first switching element and a first capacitive element; and a second loop circuit that includes a second switching element and a second capacitive element, wherein the first loop circuit and the second loop circuit include a common inductance element, wherein electric current alternately flows through the first loop circuit or the second loop circuit as the first switching element is turned on or off, a first direct-current power source or a ground is connected to a median point between the first switching element and the first capacitive element in the first loop circuit, a second direct-current power source having a voltage different from a voltage of the first direct-current power source is connected to a median point between the second switching element and the second capacitive element in the second loop circuit, and the first loop circuit and the second loop circuit are arranged so that one of the first loop circuit and the second loop circuit surrounds the other one of the first loop circuit and the second loop circuit. The area of an overlapped portion between a portion surrounded by the first loop circuit and a portion surrounded by the second loop circuit may be larger than or equal to the area of a non-overlapped portion within the portion surrounded by the first loop circuit or the portion surrounded by the second loop circuit.

With the aspects of the invention, it is possible to obtain a voltage conversion device, or the like, that is able to effectively reduce noise due to fluctuations in magnetic fields formed in a first loop circuit and a second loop circuit.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a view that shows another example of a method of connecting an electrical load;

FIG. 6A to FIG. 6E are waveform charts that illustrate magnetic flux fluctuations reduction effect in the voltage conversion device according to the embodiment;

FIG. 7A and FIG. 7B are views that show a mounting example that implements the circuit configuration of the voltage conversion device according to the embodiment;

FIG. 11 is a graph that shows the waveform of noise measured by actually operating the device shown in FIG. 9A and FIG. 9B and the waveform of noise measured by actually operating the device shown in FIG. 10A and FIG. 10B;

DETAILED DESCRIPTION OF EMBODIMENTS

Hereinafter, embodiments of the invention will be described with reference to the accompanying drawings.

Figure 3:
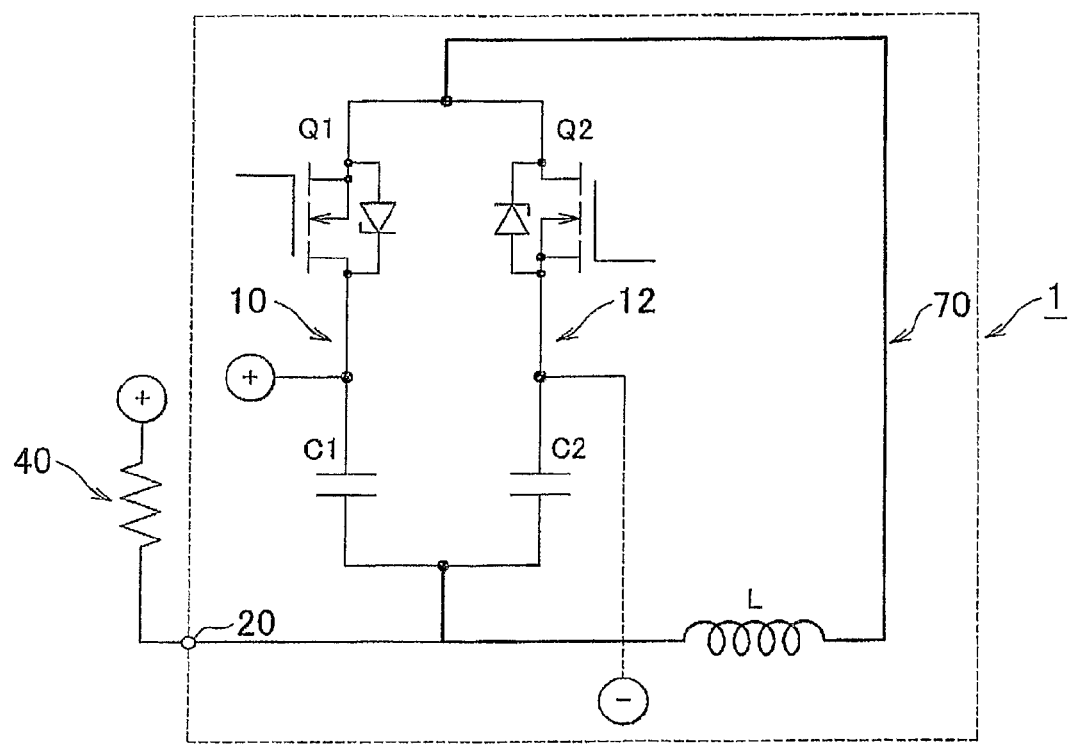
FIG. 3 is a view that shows the circuit configuration of a voltage conversion device according to an embodiment of the invention.

FIG. 3 is a view that shows the circuit configuration of a voltage conversion device 1 according to an embodiment of the invention. The voltage conversion device 1 according to the present embodiment is formed so that the circuit configuration of the voltage conversion device 1 shown in FIG. 3 is arranged substantially directly on one surface of a substrate in a planar manner.

The voltage conversion device 1 according to the present embodiment is a synchronous rectification non-insulated DC-DC converter. The voltage conversion device 1 includes a first loop circuit 10 and a second loop circuit 12. A driving target electrical load 40 is connected to an output terminal 20 of the voltage conversion device 1. The first loop circuit 10 and the second loop circuit 12 share an inductance L. In the example shown in the drawing, the first loop circuit 10 is arranged so as to surround the second loop circuit 12.

The first loop circuit 10 further includes a switching element Q1 and a capacitor C1 in addition to the inductance L. The switching element Q1 is a metal oxide semiconductor field-effect transistor (MOSFET) in this embodiment. Instead, the switching element Q1 may be another transistor, such as an insulated gate bipolar transistor (IGBT). The switching element Q1 is connected in series with the inductance L between a positive terminal and the output terminal 20. Then, when an Nch-MOSFET is used as the switching element Q1, the drain of the switching element Q1 is connected to the positive terminal and the source thereof is connected to the inductance L. On the other hand, when a Pch-MOSFET is used as the switching element Q1, the source of the switching element Q1 is connected to the positive terminal and the drain thereof is connected to the inductance L. The capacitor C1 is connected in parallel with the switching element Q1 and the inductance L between the positive terminal and the output terminal 20.

Similarly, the second loop circuit 12 further includes a switching element Q2 and a capacitor C2 in addition to the inductance L. The switching element Q2 is a MOSFET in this embodiment. Instead, the switching element Q2 may be another transistor, such as an IGBT. The switching element Q2 is connected in series with the inductance L between a negative terminal and the output terminal 20. Then, when an Nch-MOSFET is used as the switching element Q2, the drain of the switching element Q2 is connected to the inductance L and the source thereof is connected to the negative terminal. On the other hand, when a Pch-MOSFET is used as the switching element Q2, the source of the switching element Q2 is connected to the inductance L and the drain thereof is connected to the negative terminal. The capacitor C2 is connected in parallel with the switching element Q2 and the inductance L between the negative terminal and the output terminal 20.

A first direct-current power source (see a direct-current power source 203 in FIG. 19) is connected to the positive terminal. A second direct-current power source (not shown) having a voltage lower than that of the first direct-current power source is connected to the negative terminal. The rated voltage of the first direct-current power source and the rated voltage of the second direct-current power source may be selected as long as the rated voltage of the second direct-current power source is lower than the rated voltage of the first direct-current power source. Typically, a ground (that is, 0 V) is connected to the negative terminal. Hereinafter, in order to prevent complication of description, the negative terminal is connected to the ground unless otherwise specified.

The capacitor C1 and the capacitor C2 mainly have the function of smoothing the output voltage of the voltage conversion device 1 and reducing noise generated in the voltage conversion device 1. The capacitor C1 and the capacitor C2 desirably have the same capacitance. In addition, in order to reduce the influence of degradation, a ceramic capacitor, of which the durability is hard to degrade, is desirably used as the capacitor C1 and the capacitor C2.

The switching elements Q1 and Q2 are controlled so that one of the switching elements Q1 and Q2 is turned on while the other is turned off. The derailed control mode of the switching elements Q1 and Q2 (for example, a method of setting and adjusting dead time, or the like) may be selected.

The voltage conversion device 1 according to the present embodiment is configured so that loop electric current that flows through the second loop circuit 12 and loop electric current that flows through the first loop circuit 10 have the same direction. That is, as is apparent through comparison between the voltage conversion device 1 according to the present embodiment and the existing configuration shown in FIG. 1 and FIG. 2, the voltage conversion device 1 according to the present embodiment is formed by folding the existing configuration shown in FIG. 1 along the line X-X in FIG. 1. By so doing, in contrast with the existing configuration shown in FIG. 1, when the voltage conversion device 1 operates, the direction of loop electric current that flows through the second loop circuit 12 and the direction of loop electric current that flows through the first loop circuit 10 coincide with each other.

Figure 4A:
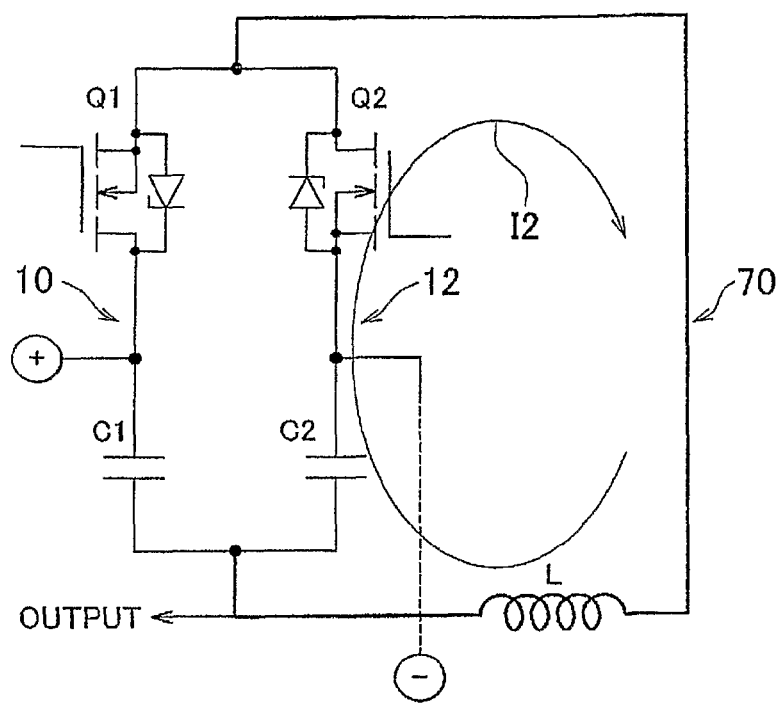
FIG. 4A is a view that shows the direction of loop electric current that flows through a second loop circuit.
Figure 4B:
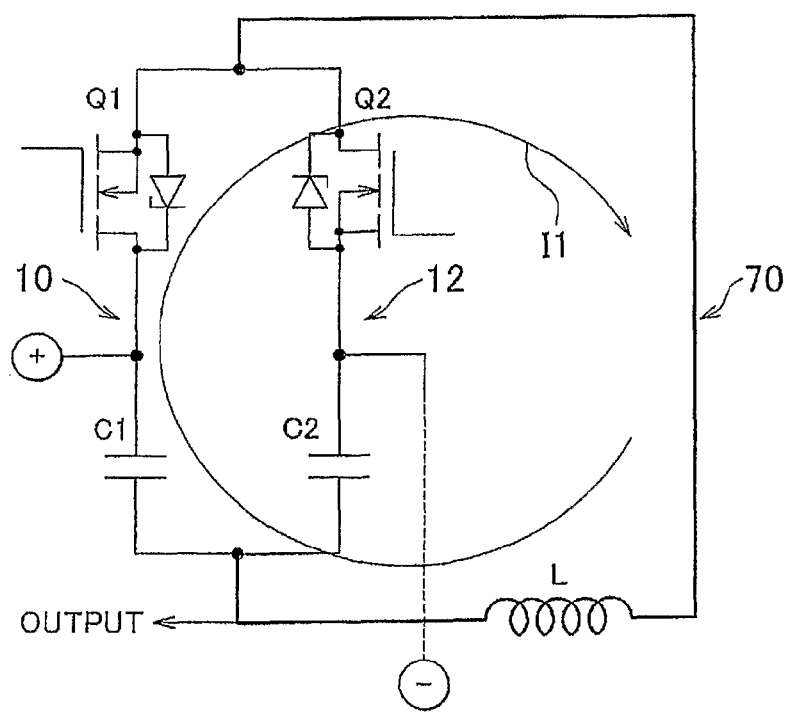
FIG. 4B is a view that shows the direction of loop electric current that flows through a first loop circuit.

In the example shown in FIG. 3, during operation, as the switching element Q2 turns on, the switching element Q1 synchronously turns off. Then, as shown in FIG. 4A, electric current I2 flows through the second loop circuit 12 in a loop of the direction indicated by the arrow in the drawing. As the switching element Q2 switches from on to off, the switching element Q1 synchronously switches from off to on. Thus, as shown in FIG. 4B, electric current I1 flows through the first loop circuit 10 in a loop of the direction indicated by the arrow in the drawing. In this way, by appropriately controlling a duration during which the switching element Q2 is turned on (on duty), it is possible to convert the voltage of the first direct-current power source into a desired voltage (step-down conversion) and outputs the voltage to the output terminal 20.

Note that, in the example shown in FIG. 3, the positive terminal is connected to the other end (terminal that is not located at the output terminal 20 side) of the electrical load 40, so the on-off operation of the switching element Q2 substantially determines the duty, and the switching element Q1 functions as a synchronous rectification switching element. Note that, for example, when the cost is given a higher priority than energy efficiency, the switching element Q1 may be omitted (only a diode is used). In addition, for example, as shown in FIG. 5, the negative terminal may be connected to the other end (terminal that is not located at the output terminal 20 side) of the electrical load 40. In this case, inversely to the example shown in FIG. 3, the on-off operation of the switching element Q1 substantially determines the duty, and the switching element Q2 functions as a synchronous rectification switching element. Note that in the example shown in FIG. 5 as well, for example, when the cost is given a higher priority than energy efficiency, the switching element Q2 may be omitted (only a diode is used).

Figure 1:
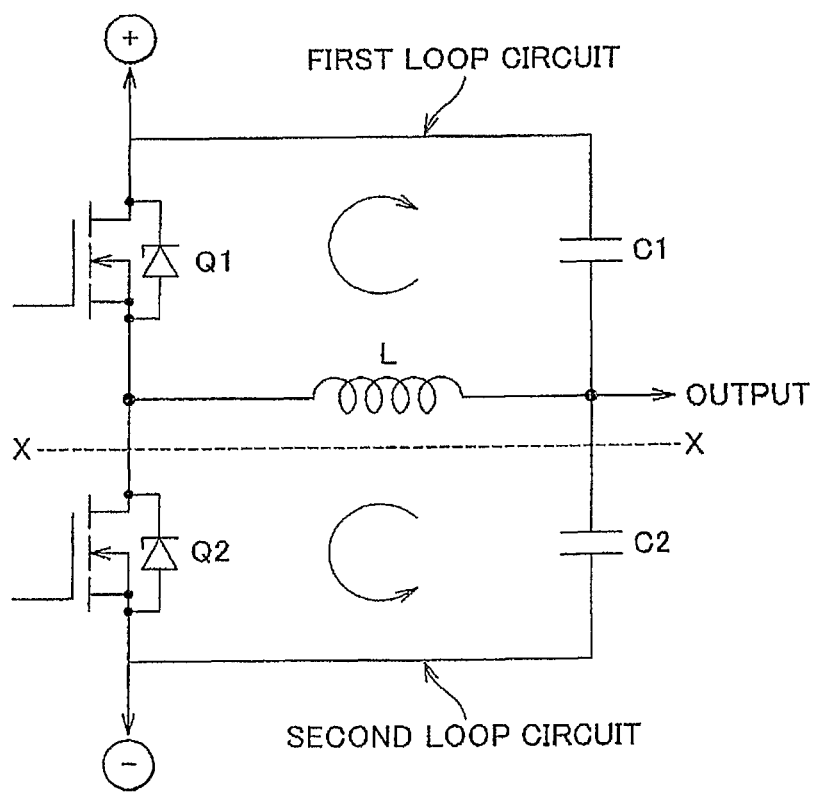
FIG. 1 is a view that shows the circuit configuration of an existing DC-DC converter.
Figure 2:
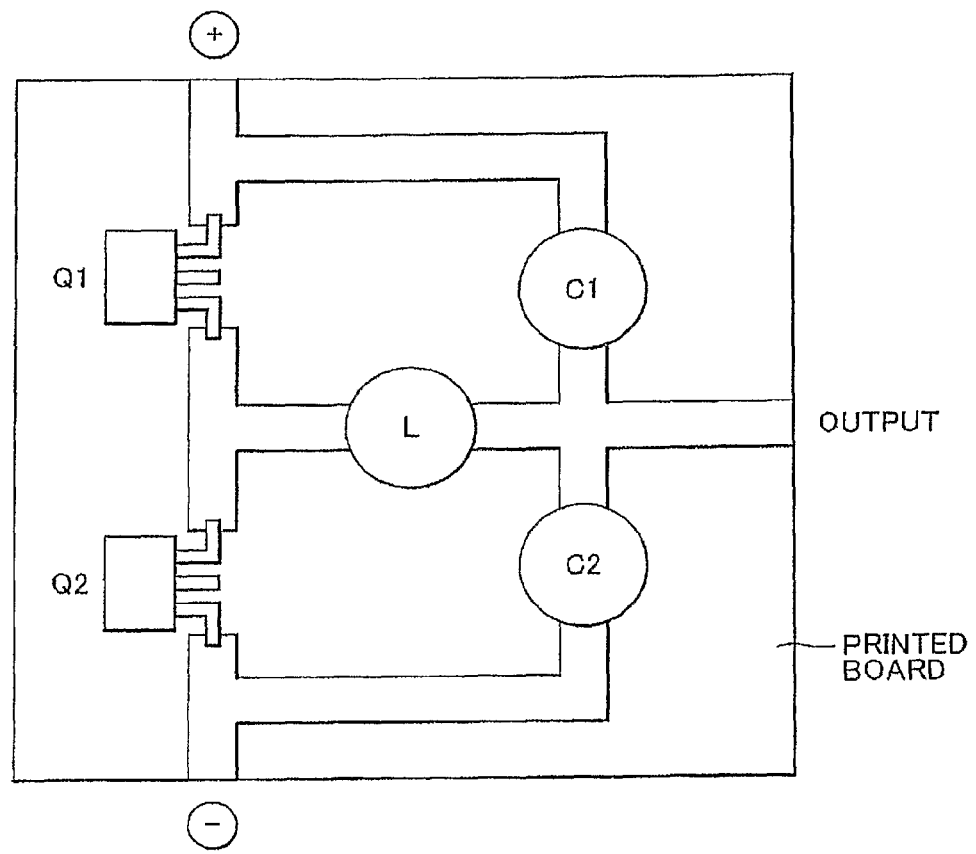
FIG. 2 is a view that shows the component arrangement of the existing DC-DC converter.

Incidentally, as described above with reference to FIG. 2, when the circuit configuration of the voltage conversion device shown in FIG. 1 is directly arranged in a planar manner, there is a problem that, when the switching element Q2 is turned on or off at high speed, a magnetic field that penetrates through the first loop circuit and a magnetic field that penetrates through the second loop circuit, having opposite directions, are alternately generated at high speed and, therefore, high-frequency noise due to high-frequency fluctuations in the magnetic fields occurs.

In contrast, with the voltage conversion device 1 according to the present embodiment, as shown in FIG. 4A and FIG. 4B, when the switching element Q2 is turned on or off at high speed, the direction of the electric current I1 and the direction of the electric current I2 are the same, and a magnetic field that penetrates through the first loop circuit and a magnetic field that penetrates through the second loop circuit, having the same direction, are alternately generated at high speed. Thus, it is possible to reduce high-frequency noise due to high-frequency fluctuations in the magnetic fields at a common loop portion (loop portion 70 indicated by the wide line in FIG. 3) of the first loop circuit 10 and second loop circuit 12, that is, an overlapped portion 80 (see FIG. 12) between the first loop circuit 10 and the second loop circuit 12.

In order to efficiently obtain the above effect, the first loop circuit 10 and the second loop circuit 12 are desirably formed so that the area of the common loop portion (loop portion 70 indicated by the wide line in FIG. 3) is large.

FIG. 6A to FIG. 6E are waveform charts that illustrate magnetic flux fluctuations reduction effect in the above described embodiment.

As described above, as the switching elements Q2 and Q1 are driven by predetermined duties that are inverted from each other, electric current flows through the second loop circuit 12 in waveform shown in FIG. 6A, and electric current flows through the first loop circuit 10 in waveform shown in FIG. 6B. At this time, due to electric current that flows through the second loop circuit 12, a magnetic flux $\phi 2$ that penetrates through the second loop circuit 12 is generated in waveform (time sequence) shown in FIG. 6C, and, due to electric current that flows through the first loop circuit 10, a magnetic flux $\phi 1$ that penetrates through the first loop circuit 10 is generated in waveform (time sequence) shown in FIG. 6D. The above magnetic fluxes $\phi 2$ and $\phi 1$ respectively fluctuate by a large amount in a short period of time because the switching elements Q2 and Q1 are driven at high speed. In the present embodiment, as described above, loop electric current that flows through the second loop circuit 12 and loop electric current that flows through the first loop circuit 10 have the same direction, and the magnetic flux φ2 shown in FIG. 6C and the magnetic flux φ1 shown in FIG. 6D have the same direction. Therefore, the composite waveform of these waveforms (time sequence) has no steep fluctuations as shown in FIG. 6E. That is, a magnetic flux change with small temporal fluctuations is implemented at the common loop portion 70 (see FIG. 3) of the first loop circuit 10 and second loop circuit 12, that is, the overlapped portion 80 (see FIG. 12) between the first loop circuit 10 and the second loop circuit 12. In this way, with the voltage conversion device 1 according to the present embodiment, it is possible to effectively reduce noise generated by high-frequency fluctuations in magnetic flux φ1+φ2.

FIG. 7A and FIG. 7B are views that show a mounting example that implements the circuit configuration of the voltage conversion device 1 according to the embodiment. FIG. 7A shows the configuration of a front surface of a printed board. FIG. 7B shows the configuration of a rear surface of the printed board. Note that the substrate may be a substrate of a selected type, and may be, for example, a flexible substrate.

In the example shown in FIG. 7A and FIG. 7B, the whole of both the first loop circuit 10 and the second loop circuit 12 are arranged on the same surface of the substrate (front surface of the substrate). As shown in FIG. 7A, the pattern for connecting the switching element Q1 to the capacitor C1 in the first loop circuit 10 is desirably arranged in proximity to the pattern for connecting the switching element Q2 to the capacitor C2 in the second loop circuit 12 as much as possible. By so doing, it is possible to improve noise reduction effect by increasing the area of the common loop portion (see the reference numeral 70 in FIG. 3) of the first loop circuit 10 and second loop circuit 12. As shown in FIG. 7B, a ground potential is formed on the rear surface of the substrate by, for example, a copper solid pattern. The second loop circuit 12 is connected to the rear surface (grounded surface) of the substrate via a through hole 80 formed at the median point between the switching element Q2 and the capacitor C2. Note that the through hole 80 is desirably arranged in proximity to the pattern for connecting the switching element Q2 to the capacitor C2 in the second loop circuit 12 as much as possible, and may be formed on the pattern for connecting the switching element Q2 to the capacitor C2 in the second loop circuit 12.

Figure 8A:
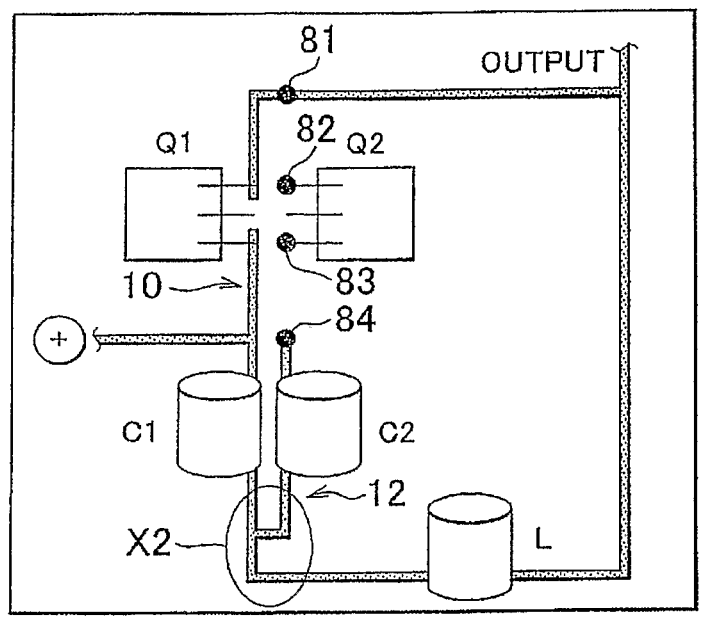
FIG. 8A and FIG. 8B are views that show another mounting example that implements the circuit configuration of the voltage conversion device according to the embodiment.
Figure 8B:
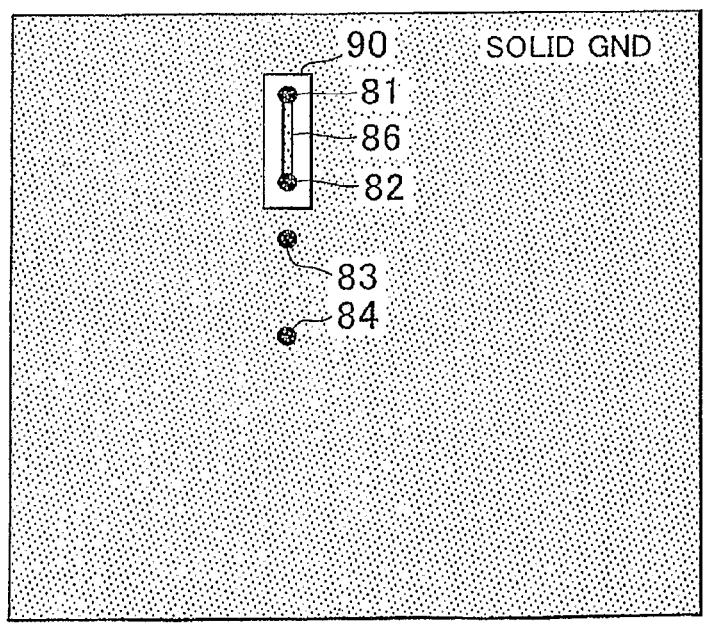

FIG. 8A and FIG. 8B are views that show another mounting example that implements the circuit configuration of the voltage conversion device 1 according to the embodiment. FIG. 8A shows the configuration of a front surface of a printed board. FIG. 8B shows the configuration of a rear surface of the printed board. Note that the substrate may be a substrate of a selected type, and may be, for example, a flexible substrate.

In the example shown in FIG. 8A and FIG. 8B, the almost whole of both the first loop circuit 10 and the second loop circuit 12 are arranged on the same surface of the substrate (front surface of the substrate). That is, the example shown in FIG. 8A and FIG. 8B mainly differs from the example shown in FIG. 7A and FIG. 7B in that part of wiring is provided on the rear surface of the substrate. Specifically, in the example shown in FIG. 8A and FIG. 8B, the source of the switching element Q2 is connected to the rear surface (grounded surface) of the substrate via a through hole 83. In addition, one side of the capacitor C2 adjacent to the switching element Q2 is connected to the rear surface (grounded surface) of the substrate via a through hole 84. By so doing, the median point between the switching element Q2 and the capacitor C2 is connected to a ground. In addition, the drain of the switching element Q2 and the inductance L are connected by a wiring pattern 86 in a non-conductive region 90 of the rear surface of the substrate via through holes 82 and 81. In this case, in comparison with the example shown in FIG. 7A and FIG. 7B, it is possible to place a wiring pattern 86 that connects the drain of the switching element Q2 to the inductance L in the second loop circuit 12 in proximity to a wiring pattern that connects the source of the switching element Q1 to the inductance L in the first loop circuit 10 (ultimately, it is possible to arrange the wiring patterns at overlapped locations on both front and rear surfaces of the substrate). Thus, it is possible to increase the ratio of the loop area of the common loop portion 70 (see FIG. 3) to the loop area of the first loop circuit 10 or the second loop circuit 12. From similar point of view, as shown in the X2 region in FIG. 8A, it is also applicable that the branch point of the second loop circuit 12 from the common loop portion 70 is arranged in proximity to the capacitor C2 to thereby increase the ratio of the loop area of the common loop portion 70 (see FIG. 3) to the loop area of the first loop circuit 10 or the second loop circuit 12 (see the region X1 in FIG. 7A for comparison).

With the voltage conversion device 1 according to the above described embodiment, the following advantageous effects may be specifically obtained.

As described above, the voltage conversion device 1 is configured so that electric current that flows through the first loop circuit 10 and electric current that flows through the second loop circuit 12 have the same direction during operation of the voltage conversion device 1. Thus, it is possible to effectively reduce high-frequency noise due to high-frequency fluctuations.

In addition, the whole of the first loop circuit 10 and the second loop circuit 12 (or at least the whole of the elements of the respective circuits) are arranged on the same surface of the substrate. Thus, in comparison with the case where part of the elements of the first loop circuit 10 and the second loop circuit 12 are arranged on the rear surface of the substrate, mounting efficiency is favorable, and the flexibility of design of heat radiation structure, or the like, improves. In addition, for example, by setting noise blocking means (for example, a surface layer or another substrate layer, such as the above described solid ground) on a side on which no element is arranged, it is easy to improve immunity performance.

Figure 9A:
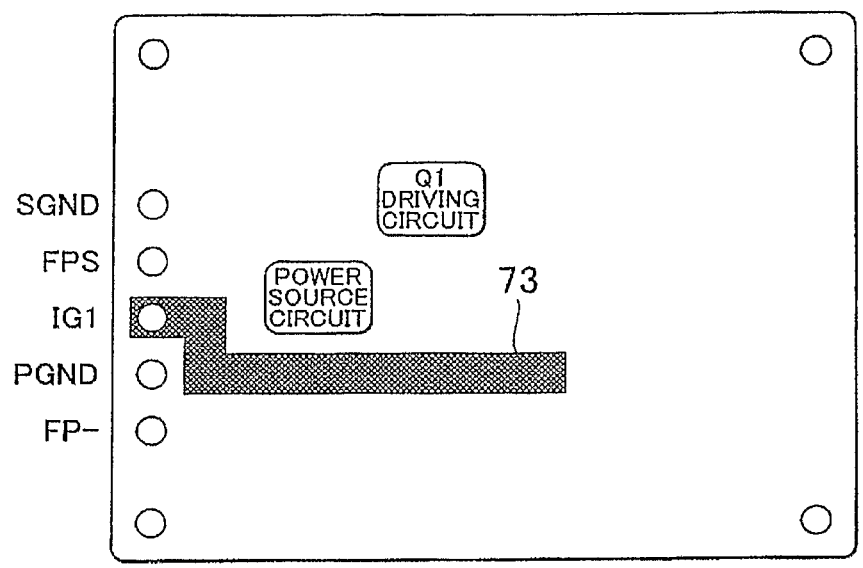
FIG. 9A and FIG. 9B are views that show the configuration of a substrate that is prototyped in correspondence with the voltage conversion device according to the embodiment.

FIG. 9A to FIG. 11 are views that show the results of test for checking the effect of the present embodiment. FIG. 9A and FIG. 9B show the configuration of a substrate that is prototyped in correspondence with the voltage conversion device 1 according to the present embodiment shown in FIG. 3. FIG. 9A shows the configuration of a front surface of a printed board. FIG. 9B shows the configuration of a rear surface of the printed board. In addition, FIG. 10A and FIG. 10B show the configuration of a substrate that is prototyped in correspondence with the existing voltage conversion device shown FIG. 1 as a comparative example. FIG. 10A shows the configuration of a front surface of a printed board. FIG. 10B shows the configuration of a rear surface of the printed board. In FIG. 9A, FIG. 9B, FIG. 10A and FIG. 10B, portions indicated by the hatching 73 correspond to a circuit portion of a power supply system (positive terminal side; +B system in this example). Portions indicated by the hatching 71 correspond to a circuit portion of an output portion. Portions indicated by the hatching 72 correspond to a circuit portion of a ground system (negative terminal side).

Figure 9B:
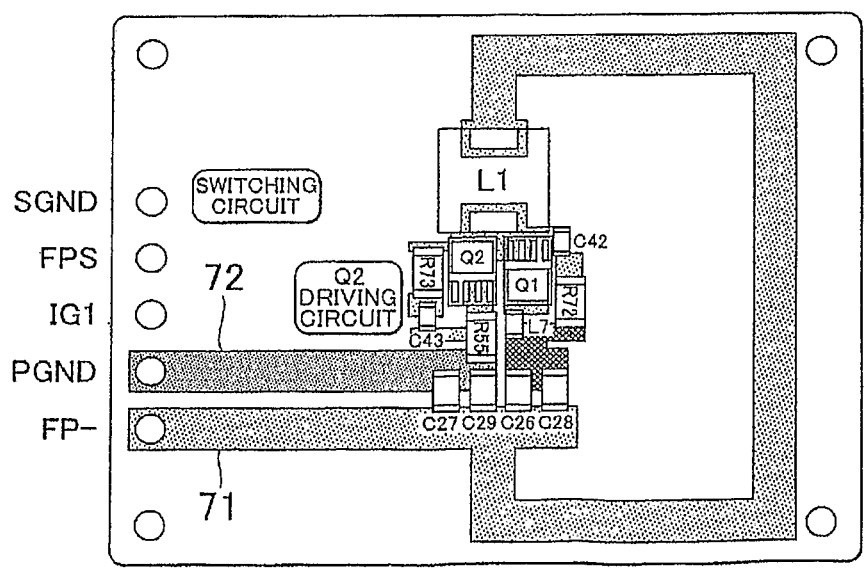
Figure 10A:
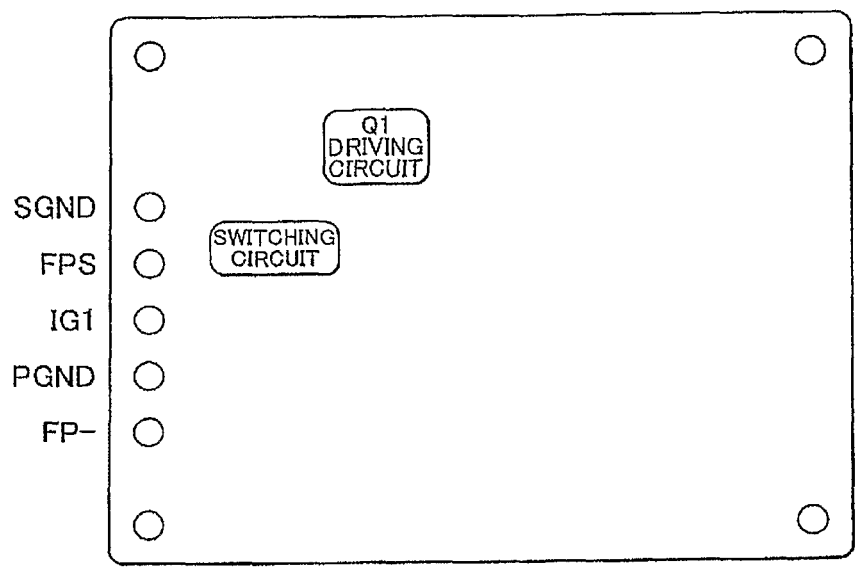
FIG. 10A and FIG. 10B are views that show the configuration of a substrate that is prototyped as an existing voltage conversion device.
Figure 10B:
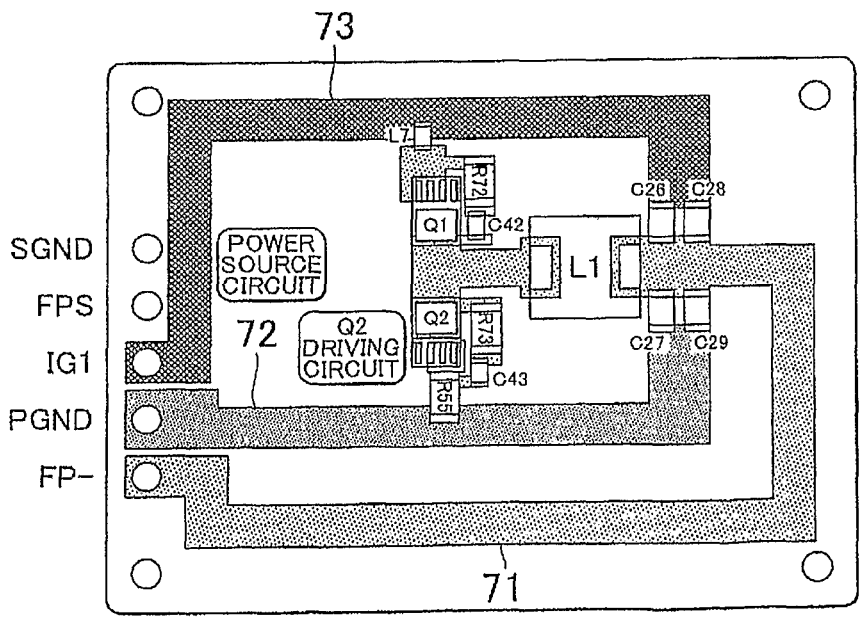

FIG. 11 shows the waveform of noise measured by actually operating the device shown in FIG. 9A and FIG. 9B and the waveform of noise measured by actually operating the device shown in FIG. 10A and FIG. 10B. In FIG. 11, the noise characteristic made by the voltage conversion device 1 according to the present embodiment is indicated by the solid line, and the noise characteristic made by the existing configuration is indicated by the dotted line. As is apparent from FIG. 11, according to the present embodiment, noise level is greatly reduced as compared with the noise characteristic made by the existing configuration.

Next, the configuration for efficiently obtaining the above described noise reduction effect (see FIG. 6A to FIG. 6E) according to the present embodiment will be described. Here, the configuration for efficiently obtaining the noise reduction effect will be described in two approaches.

The first approach is that the area of the overlapped portion between the first loop circuit 10 and the second loop circuit 12 is made to be larger than or equal to the area of a portion in which the first loop circuit 10 and the second loop circuit 12 do not overlap each other (non-overlapped portion). Note that the area is an area as viewed in a direction in which A magnetic flux penetrates (area in which a magnetic flux penetrates).

Figure 12:
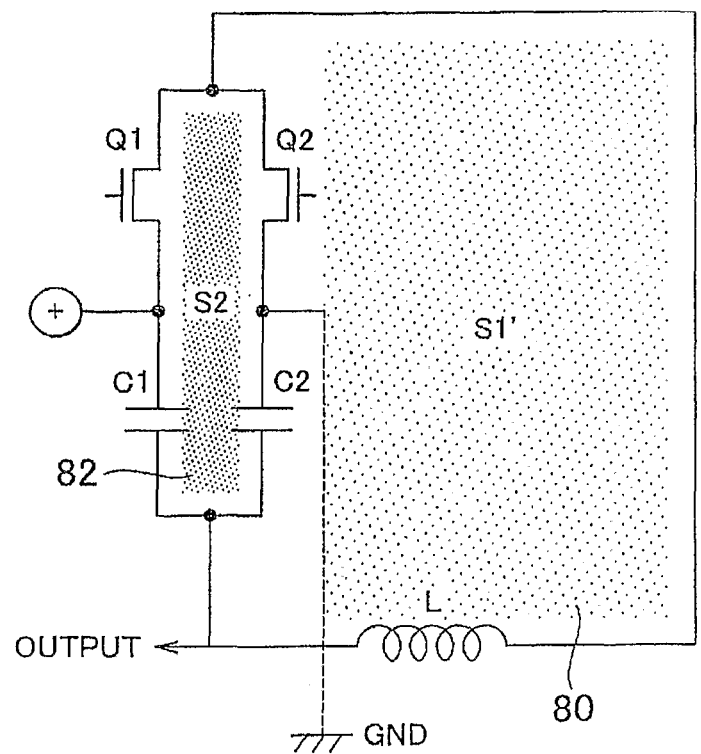
FIG. 12 is a view that illustrates a first approach for suppressing steep magnetic flux fluctuations.

FIG. 12 is a view that illustrates the first approach. In FIG. 12, the overlapped portion between the first loop circuit 10 and the second loop circuit 12 is indicated by the hatching 80, and a portion in which the first loop circuit 10 and the second loop circuit 12 do not overlap each other (non-overlapped portion) is indicated by the hatching 82. Thus, in the first approach, the area S1' of the overlapped portion 80 between the first loop circuit 10 and the second loop circuit 12 is set so as to be larger than or equal to the area S2 of the non-overlapped portion 82 between the first loop circuit 10 and the second loop circuit 12.

Here, the magnetic field and magnetic permeability of the overlapped portion 80 are respectively denoted by H1 and μ1, and the magnetic field and magnetic permeability of the non-overlapped portion 82 are respectively denoted by H2 and μ1. Note that the magnetic field H1 is generated at the overlapped portion 80 by electric current I1 (see FIG. 4B) and the magnetic field H2 is generated at the non-overlapped portion 82 by electric current I2 (see FIG. 4A). At this time, the magnetic flux Φ1 generated when electric current I1 flows is expressed as follows.

$$\Phi 1 = \int B1 \cdot S = k1 \cdot \mu 1 (H1 \cdot S1' + H2 \cdot S2) \cdot I1$$

Similarly, the magnetic flux Φ2 generated when electric current I2 flows is expressed as follows.

$$\Phi 2 = \int B2 \cdot S = k2 \cdot \mu 1 \cdot H1 \cdot S1' \cdot I2$$

From the above, k1·I1 is approximate to k2·I2, so, when S1' is sufficiently larger than S2, Φ1 is approximate to Φ2. Therefore, it appears that it is possible to suppress steep magnetic flux fluctuations. Although it depends on actual dimensions, or the like, it is desirable that the absolute value of the area of the first loop circuit 10 and the absolute value of the area of the second loop circuit 12 are small as much as possible.

The second approach is that a magnetic member is arranged in the overlapped portion 80 between the first loop circuit 10 and the second loop circuit 12. Note that, of course, the second approach may be combined with the above described first approach, and in that case, it is possible to obtain the advantageous effects including the respective advantageous effects.

Figure 13:
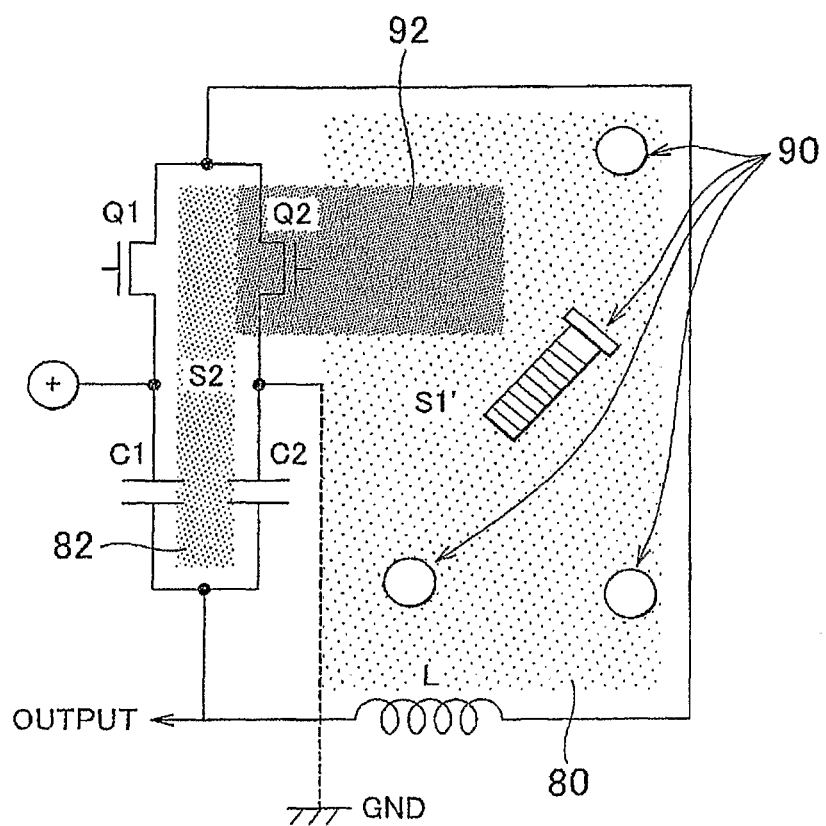
FIG. 13 is a view that illustrates a second approach for suppressing steep magnetic flux fluctuations.
Figure 14:
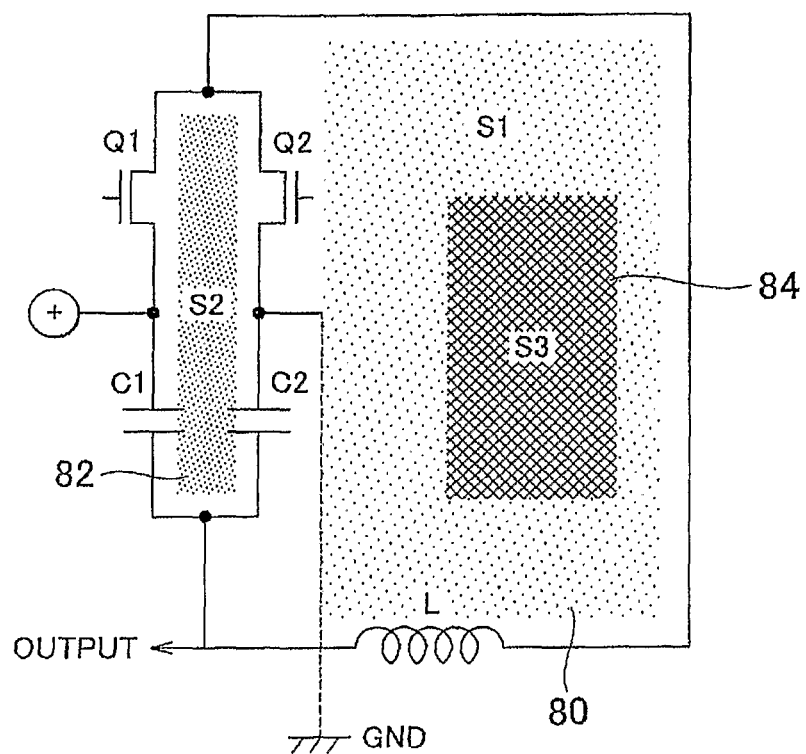
FIG. 14 is a view that illustrates the second approach.

FIG. 13 and FIG. 14 are views that illustrate the second approach. In the example shown in FIG. 13, magnetic members 90 and 92 are arranged in the overlapped portion 80 between the first loop circuit 10 and the second loop circuit 12. The magnetic members may be provided only for this purpose, and are desirably provided for another purpose in addition. In the example shown in FIG. 13, the magnetic members 90 are substrate mounting screws or positioning pins. That is, the magnetic members 90 are metal fasteners, such as screws, and positioning pins, used for mounting the substrate, on which the first loop circuit 10 and the second loop circuit 12 are formed, to a casing component member (member that constitutes a casing). In addition, the magnetic member 92 is a radiation plate for cooling the switching element Q2. Note that the magnetic member 92 may be a radiation plate that also cools the switching element Q1 together with the switching element Q2 or may be a radiation plate that cools the switching element Q1 instead of the switching element Q2.

In FIG. 14, a portion in which a magnetic material is arranged inside the overlapped portion 80 (hereinafter, referred to as "magnetic portion") is indicated by the hatching 84. Here, the magnetic field and magnetic permeability of the overlapped portion 80 are respectively denoted by H1 and μ1, the magnetic field and magnetic permeability of the non-overlapped portion 82 are respectively denoted by H2 and μ1, and the area, magnetic field and magnetic permeability of the magnetic portion 84 are respectively denoted by S3, H3 and μ2. In addition, the area of the overlapped portion 80, except the magnetic portion 84, is denoted by S1. Then, the magnetic flux Φ1 generated when electric current I1 flows is expressed as follows.

$$\Phi 1 = \int B1 \cdot S = k1 \cdot \{\mu 1 \cdot (H1 \cdot S1 + H2 \cdot S2) + \mu 2 \cdot H3 \cdot S3\} \cdot I1$$

Similarly, the magnetic flux Φ2 generated when electric current I2 flows is expressed as follows.

$$\Phi 2 = \int B2 \cdot S = k2 \cdot \{\mu 1 \cdot H1 \cdot S1 + \mu 2 \cdot H3 \cdot S3\} \cdot I2$$

From the above, k1·I1 is approximate to k2·I2, so, when S1 (or S1+S3) is sufficiently larger than S2, Φ1 is approximate to Φ2. Therefore, it appears that it is possible to suppress steep magnetic flux fluctuations. In addition, the magnetic permeability of the magnetic member 90 is desirably higher than or equal to 500, so it is possible to establish the relationship that Φ1 is approximate to Φ2 even when S2 is somewhat large.

Figure 15A:
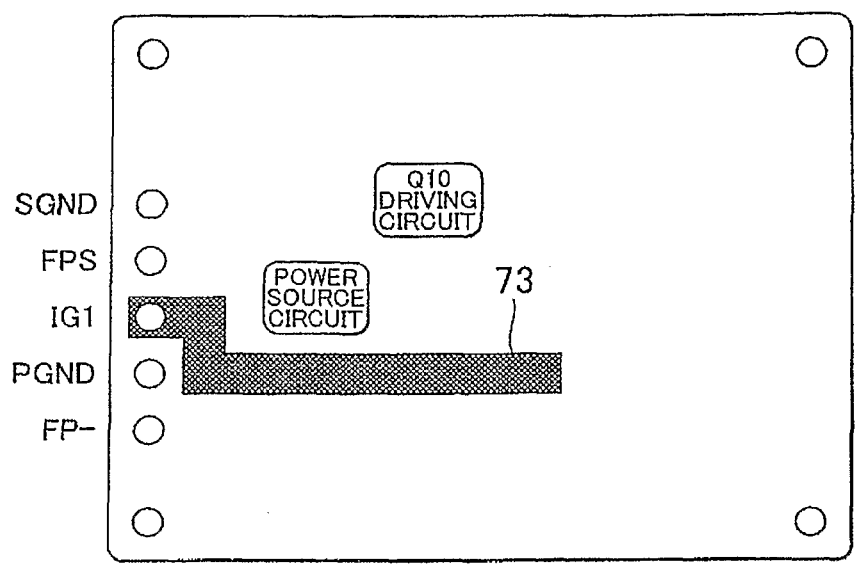
FIG. 15A and FIG. 15B are views that show the configuration of a substrate that is prototyped in correspondence with the voltage conversion device according to the embodiment.

FIG. 15A to FIG. 17 are views that show the results of test for checking the noise reduction effect obtained by the above described first approach. FIG. 15A and FIG. 15B show the configuration of a substrate that is prototyped in correspondence with the voltage conversion device 1 according to the present embodiment shown in FIG. 3, and show the configuration of the substrate when the area S1' of the overlapped portion 80 is substantially equal to the area S2 of the non-overlapped portion 82. FIG. 15A shows the configuration of a front surface of a printed board. FIG. 15B shows the configuration of a rear surface of the printed board. In addition, FIG. 16A and FIG. 16B show the configuration of a substrate that is prototyped in correspondence with the voltage conversion device 1 according to the present embodiment shown in FIG. 3, and show the configuration of the substrate when the area S1' of the overlapped portion 80 is significantly larger than the area S2 of the non-overlapped portion 82 (in this example, the non-overlapped portion 82 has a small area, so it is not shown in the drawing). FIG. 16A shows the configuration of a front surface of a printed board. FIG. 16B shows the configuration of a rear surface of the printed board. In addition, FIG. 10A and FIG. 10B show the configuration of a substrate that is prototype in correspondence with the existing voltage conversion device shown in FIG. 1 as a comparative embodiment. FIG. 10A shows the configuration of a front surface of a printed board. FIG. 10B shows the configuration of a rear surface of the printed board. In FIG. 15A to FIG. 16B, FIG. 10A and FIG. 10B, portions indicated by the hatching 73 correspond to a circuit portion of a power supply system (positive terminal side; +B system in this example). Portions indicated by the hatching 71 correspond to a circuit portion of an output portion. Portions indicated by the hatching 72 correspond to a circuit portion of a ground system (negative terminal side).

Figure 15B:
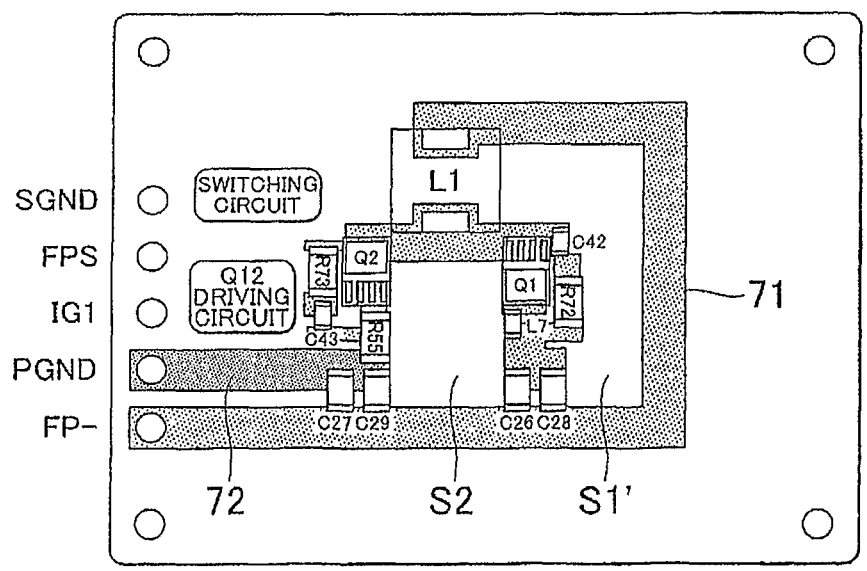
Figure 16A:
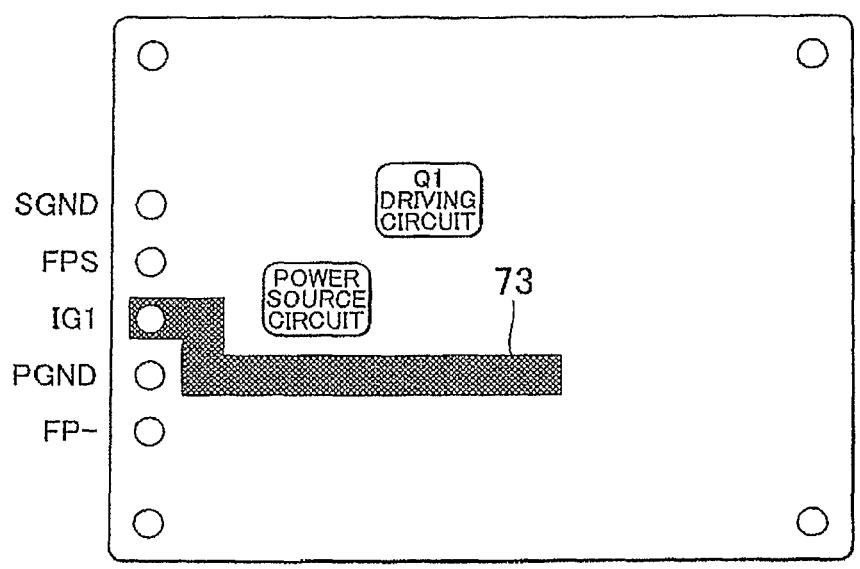
FIG. 16A and FIG. 16B are views that show the configuration of a substrate that is prototyped in correspondence with the voltage conversion device according to the embodiment.
Figure 16B:
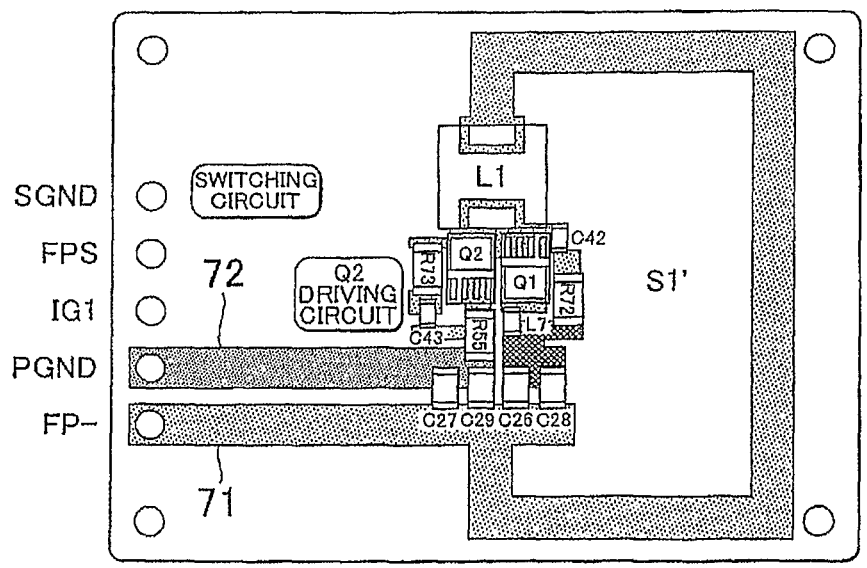
Figure 17:
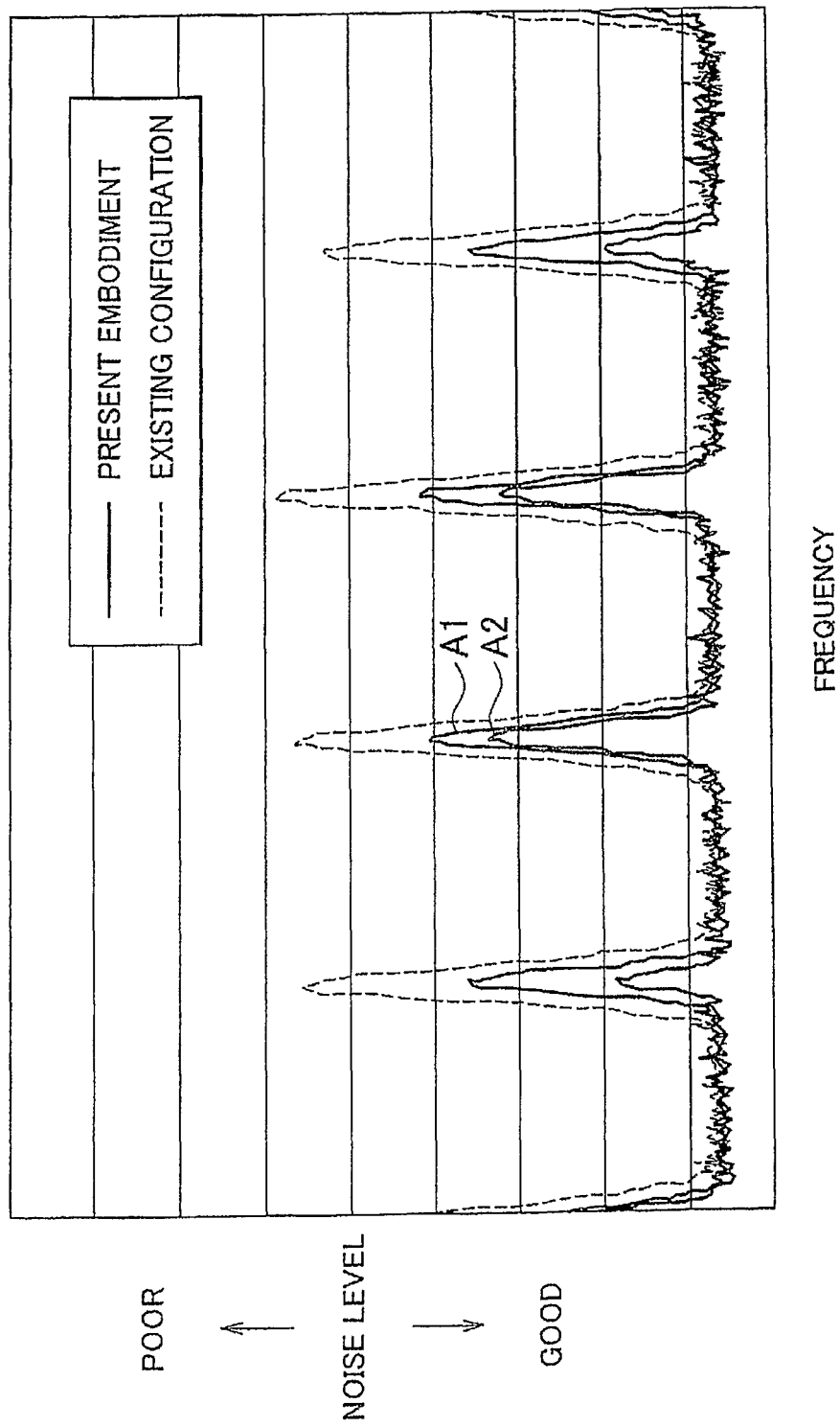
FIG. 17 is a graph that shows the waveform of noise measured by actually operating the device shown in FIG. 10A and FIG. 10B, the waveform of noise measured by actually operating the device shown in FIG. 11 and the waveform of noise measured by actually operating the device shown in FIG. 12.

FIG. 17 shows the waveform of noise measured by actually operating the device shown in FIG. 15A and FIG. 15B, the waveform of noise measured by actually operating the device shown in FIG. 16A and FIG. 16B and the waveform of noise measured by actually operating the device shown in FIG. 10A and FIG. 10B. In FIG. 17, the noise characteristic made by the voltage conversion device 1 according to the present embodiment is indicated by the solid lines A1 and A2, and the noise characteristic made by the existing configuration is indicated by the dotted line. As is apparent from FIG. 17, according to the present embodiment, noise level is greatly reduced as compared with the noise characteristic made by the existing configuration. In addition, it appears that, even when the area S1' of the overlapped portion 80 is substantially equal to the area S2 of the non-overlapped portion 82, as indicated by the solid line A1, noise level is greatly reduced as compared with the existing configuration. In addition, it appears that, when the area S1' of the overlapped portion 80 is significantly larger than the area S2 of the non-overlapped portion 82, as indicated by the solid line A2, noise level is further reduced as compared with the case where the area S1' of the overlapped portion 80 is substantially equal to the area S2 of the non-overlapped portion 82.

Thus, in the present embodiment, it is desirable that the area S1' of the overlapped portion 80 is larger than the area S2 of the non-overlapped portion 82, more desirably, the area S1' of the overlapped portion 80 is larger than or equal to twice the area of the non-overlapped portion 82, and further desirably, the area S1' of the overlapped portion 80 is larger than or equal to ten times the area S2 of the non-overlapped portion 82.

Figure 18:
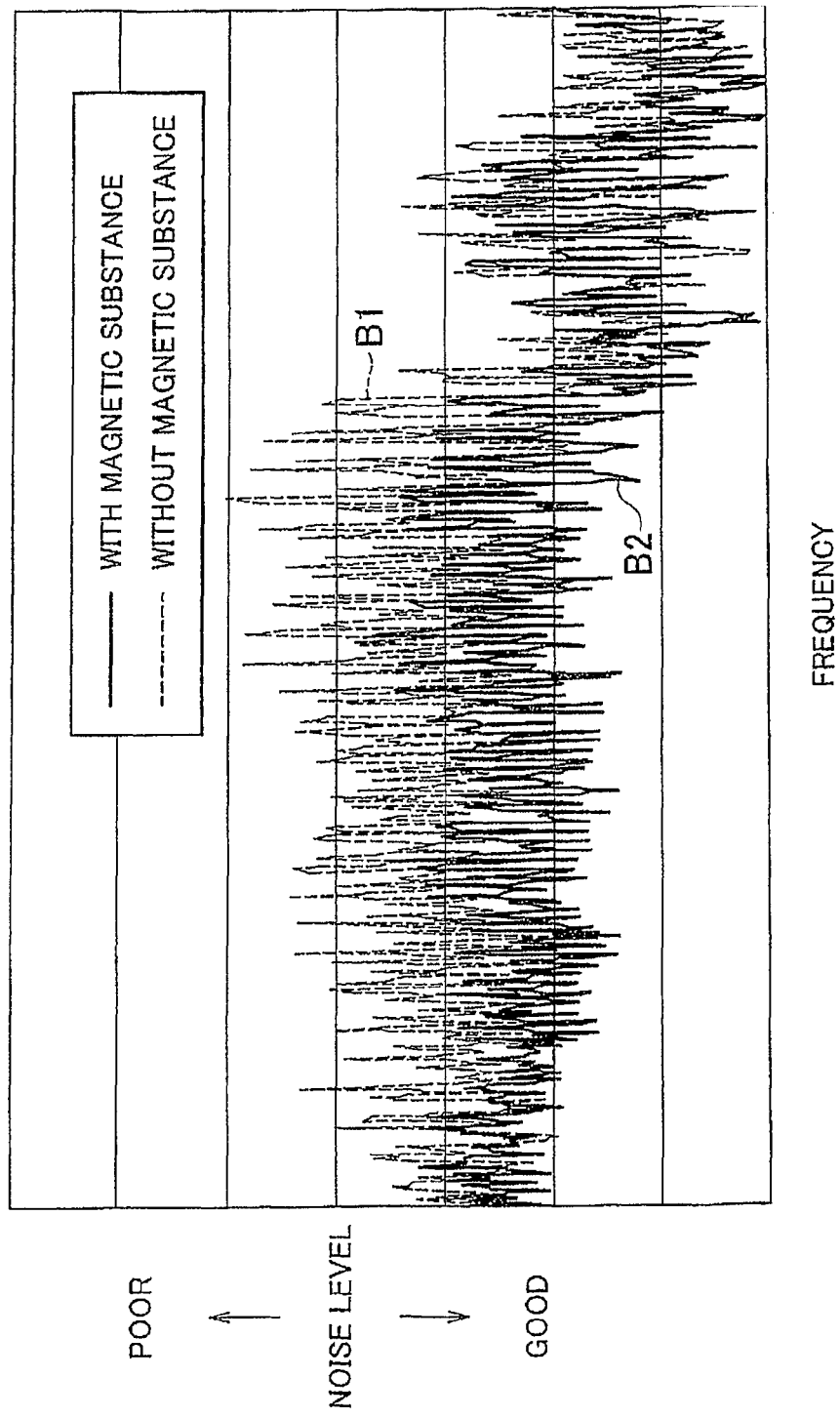
FIG. 18 is a graph that shows the results of test for checking noise reduction effect through the second approach.

FIG. 18 is a graph that shows the results of test for checking noise reduction effect through the above described second approach (arranging a magnetic substance). FIG. 18 shows the results of the case where no magnetic substance is arranged in the overlapped portion 80 in the configuration of the substrate shown in FIG. 16A and FIG. 16B by the curved line B1, and shows the results of the case where a magnetic substance is arranged in the overlapped portion 80 in the configuration of the substrate shown in FIG. 16A and FIG. 16B by the curved line B2. It appears from FIG. 18 that, when a magnetic substance is arranged in the overlapped portion 80 between the first loop circuit 10 and the second loop circuit 12, noise level is further reduced as compared with the case where no magnetic substance is arranged in the overlapped portion 80.

Figure 19:
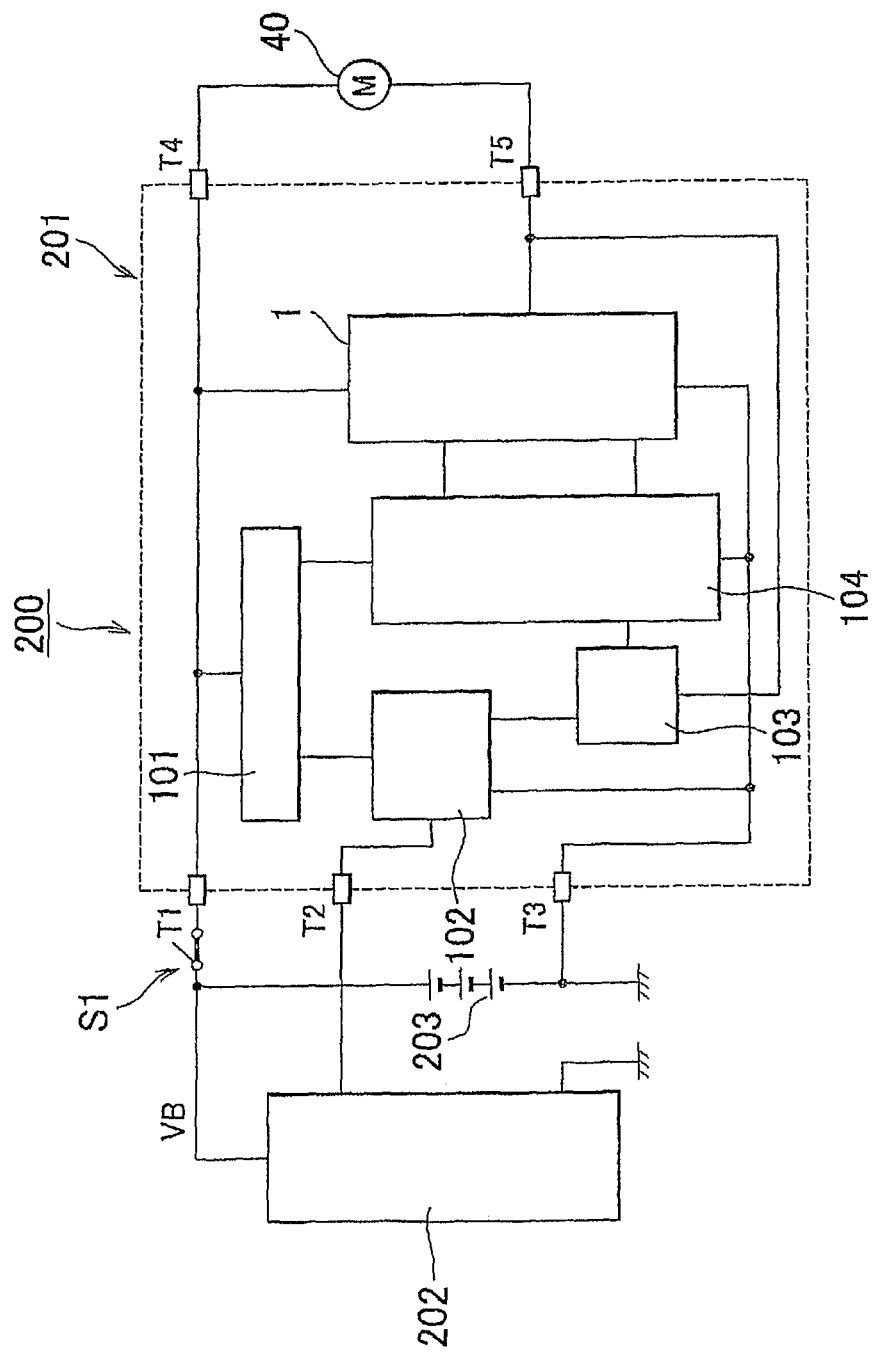
FIG. 19 is a configuration diagram that shows an electrical load driving device according to an embodiment of the invention.

FIG. 19 is a configuration diagram that shows an electrical load driving device 200 according to an embodiment of the invention.

The electrical load driving device 200 according to the present embodiment includes an electrical load driving circuit device 201, a control target signal generating device (PCM) 202 and a direct-current power source 203. The electrical load driving circuit device 201 includes the above described voltage conversion device 1, and includes an internal power source circuit 101, an input signal interface circuit 102, a switching duty generating circuit 103 and a switching element driving circuit 104. Note that terminals T1 and T4 correspond to the above described positive terminal, a terminal T3 corresponds to the negative terminal, and T5 corresponds to the output terminal 20 of the voltage conversion device 1. Note that, instead of the voltage conversion device 1, a voltage conversion device 2 or 3 according to other embodiments, which will be described later, may be used.

In the example shown in FIG. 19, the electrical load 40 is an inductive load, and is a fuel pump used for a vehicle engine. However, the electrical load 40 may be a selected electrical load, such as a fan and an assist motor of a steering. In addition, a switch S1 corresponds to an ignition switch.

The control target signal generating device 202 is formed of a microcomputer, and may be, for example, an EFI-ECU that controls the vehicle engine. The control target signal generating device 202 determines a control target value (for example, target rotational speed) of the fuel pump, and inputs a control target signal indicating the control target value to the electrical load driving circuit device 201. Note that the control target signal generating device 202 operates on a power source voltage from the direct-current power source 203, and may include a step-down circuit, or the like, inside.

The control target signal from the control target signal generating device 202 is processed by the input signal interface circuit 102 of the control target signal generating device 202, and the switching duty generating circuit 103 determines the duty for implementing the control target value. Then, the switching element driving circuit 104 performs on-off control over the switching elements Q1 and Q2 on the basis of the determined duty.

The embodiments of the invention are described in detail above; however, the aspect of the invention is not limited to the above described embodiments. The above described embodiments may undergo various modifications or replacements without departing from the scope of the invention.

Figure 20:
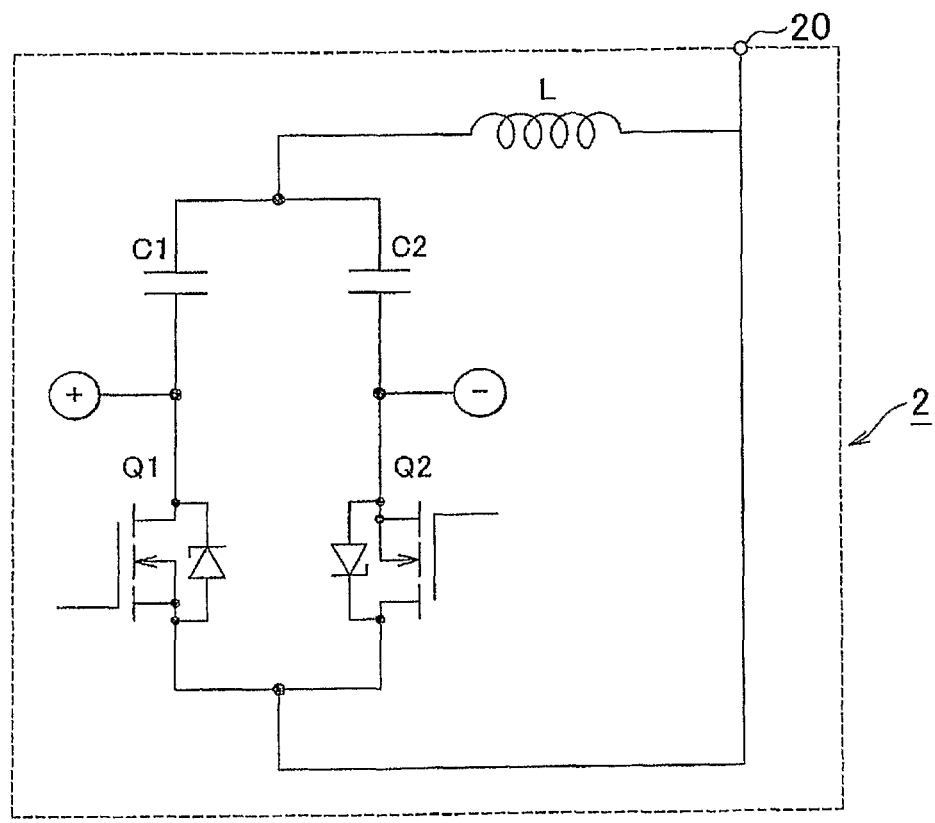
FIG. 20 is a view that shows the circuit configuration of a voltage conversion device according to another embodiment.
Figure 21:
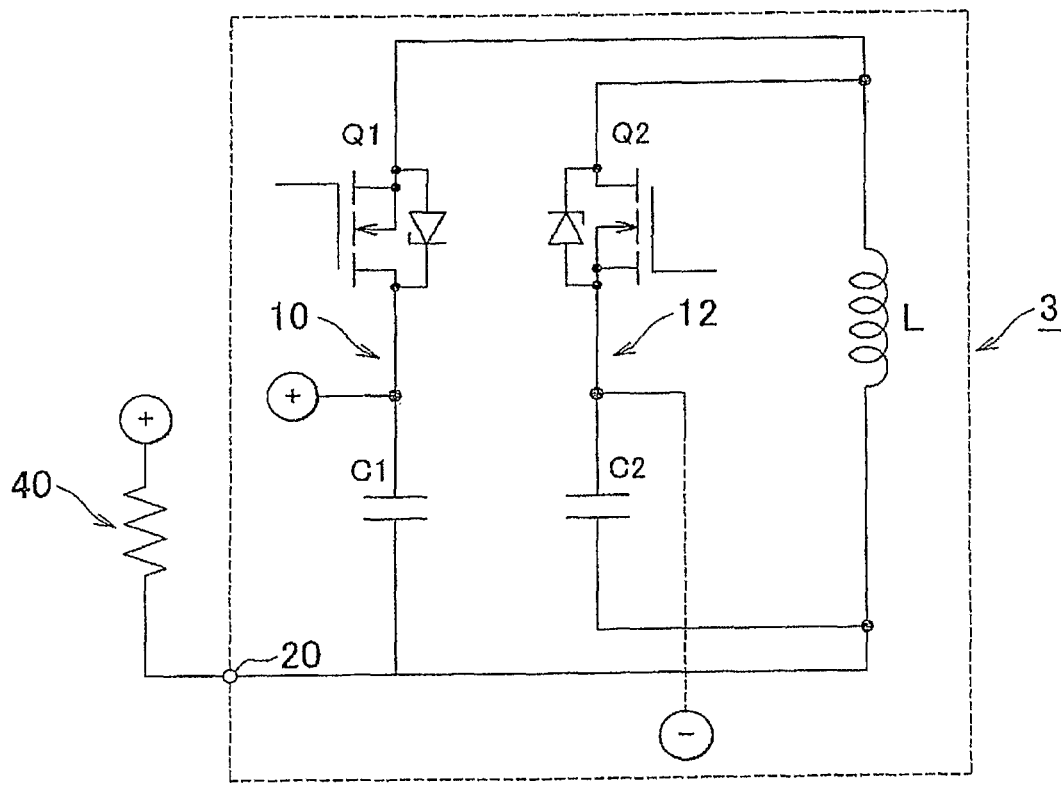
FIG. 21 is a view that shows the circuit configuration of a voltage conversion device according to another embodiment of the invention.

For example, in the above embodiment, the specific example of the configuration that electric current that flows through the first loop circuit 10 and electric current that flows through the second loop circuit 12 have the same direction during operation of the voltage conversion device 1 is described; however, the aspect of the invention is not limited to this configuration. For example, as shown in FIG. 20, a modification equivalent to the configuration shown in FIG. 3 may be added. In addition, in the configuration shown in FIG. 3, or the like, the second loop circuit 12 is surrounded by the first loop circuit 10. Conversely, the first loop circuit 10 may be surrounded by the second loop circuit 12 instead. Alternatively, in the configuration shown in FIG. 3, the common loop portion 70 (length of the common portion) occupies the ratio of at least half or above the length of the entire loop, and occupies the ratio of about two thirds to three fourths of the length of the entire loop. Instead, as shown in FIG. 21, the ratio of the common loop portion to the length of the entire loop may be smaller than half the length of the entire loop. With the above configuration as well, the second loop circuit 12 is surrounded by the first loop circuit 10, so it is possible to attain the above described noise reduction effect.

Figure 22A:
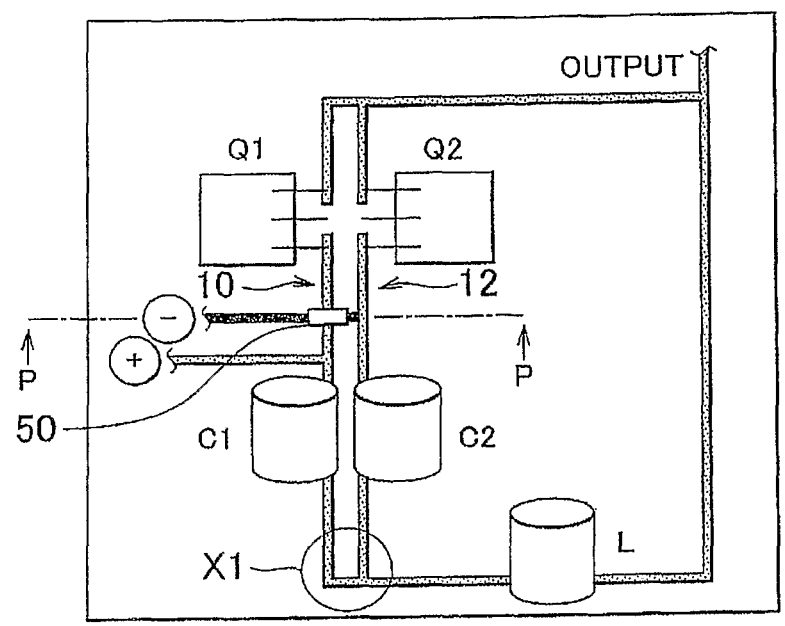
FIG. 22A and FIG. 22B are views that show further another mounting example that implements the circuit configuration of the voltage conversion device according to the embodiment.
Figure 22B:
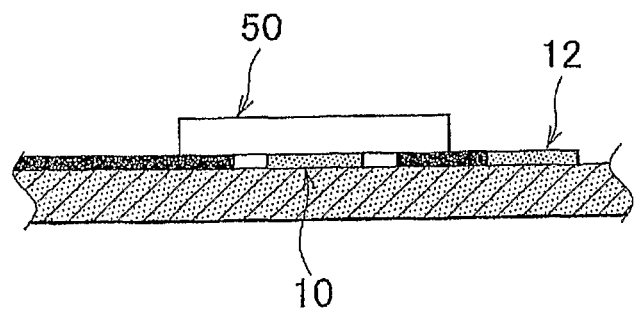

In addition, in the above described embodiment, for example, as shown in FIG. 7A and FIG. 7B or FIG. 8A and FIG. 8B, the second loop circuit 12 is connected to the rear surface (grounded surface) of the substrate via the through hole 80; however, the aspect of the invention is not limited to this configuration. For, example, as shown in FIG. 22A and FIG. 22B, the second loop circuit 12 may be connected to a ground (negative terminal), formed on the front surface of the substrate, via a chip juniper 50 (or an element of its kind) that straddles the first loop circuit 10 in an insulated manner. Note that FIG. 22B corresponds to a cross sectional view taken along the line P-P in FIG. 22A. With the configuration shown in FIG. 22A and FIG. 22B, it is advantageous in that a desired wiring pattern and component arrangement may be implemented on one side of the substrate.

In addition, in the above described example, in order to, for example, improve immunity performance, components (mainly, elements) of both the first loop circuit 10 and the second loop circuit 12 are formed on the same surface of the substrate. One of the first loop circuit 10 and the second loop circuit 12 or part of any of the first loop circuit 10 and the second loop circuit 12 may be formed on the rear surface of the same substrate or may be formed on another substrate stacked on the above substrate.

In addition, in the above described embodiment, the aspect of the invention is applied to the step-down voltage conversion device. Instead, the aspect of the invention may be applied to a step-up or bidirectional voltage conversion device.

The invention claimed is:

1. A voltage conversion device comprising:
    a first loop circuit that includes a first switching element; and
    a second loop circuit, wherein the first loop circuit and the second loop circuit include a common inductance element and a common loop portion having a noise reduction member arranged within the common loop portion, wherein the common loop portion includes a portion of the first and second loop circuits that overlap each other, wherein
    electric current alternately flows through the first loop circuit or the second loop circuit as the first switching element is turned on or off,
    a magnetic field that is formed when the first switching element is turned on and that penetrates through the first loop circuit and a magnetic field that is formed when the first switching element is turned off after the first switching element is turned on and that penetrates through the second loop circuit having the same direction,
    all elements that constitute the first loop circuit and the second loop circuit are arranged on the same surface of a substrate, and
    the second loop circuit is connected to a second direct-current power source, and the first loop circuit is connected to a first direct-current power source that has a voltage different from a voltage of the second direct-current power source.

2. The voltage conversion device according to claim 1, wherein the first loop circuit includes a first capacitive element, and the second loop circuit includes a second capacitive element.

3. The voltage conversion device according to claim 1, wherein the second loop circuit includes a second switching element, and the first switching element and the second switching element are controlled so that one of the first switching element and the second switching element is turned on while the other one of the first switching element and the second switching element is turned off synchronously.

4. The voltage conversion device according to claim 2, wherein the first direct-current power source is connected to a median point between the first switching element and the fast capacitive element in the first loop circuit.

5. The voltage conversion device according to claim 1, wherein
    the first loop circuit includes a first capacitive element, and the second loop circuit includes a second capacitive element,
    the second loop circuit includes a second switching element,
    the first switching element and the second switching element are controlled so that one of the first switching element and the second switching element is turned on while the other one of the first switching element and the second switching element is turned off synchronously, and
    the second direct-current power source is connected to a median point between the second switching element and the second capacitive element in the second loop circuit.

6. The voltage conversion device according to claim 1, wherein the first loop circuit and the second loop circuit are formed on a common substrate, and a magnetic substance is arranged within an overlapped portion in the substrate between a portion surrounded by the first loop circuit and a portion surrounded by the second loop circuit, wherein the overlapped portion is defined by the common loop portion.

7. The voltage conversion device according to claim 1, wherein the first loop circuit and the second loop circuit are formed on a common substrate, and a metal fastening member for mounting the substrate on a casing component is arranged within an overlapped portion in the substrate between a portion surrounded by the first loop circuit and a portion surrounded by the second loop circuit, wherein the overlapped portion is defined by the common loop portion.

8. The voltage conversion device according to claim 1, wherein the first loop circuit and the second loop circuit are formed on a common substrate, and a metal member for cooling the first switching element is arranged within an overlapped portion in the substrate between a portion surrounded by the first loop circuit and a portion surrounded by the second loop circuit, wherein the overlapped portion is defined by the common loop portion.

9. The voltage conversion device according to claim 3, wherein the first loop circuit and the second loop circuit are formed on a common substrate, and a metal member for cooling the second switching element is arranged within an overlapped portion in the substrate between a portion surrounded by the first loop circuit and a portion surrounded by the second loop circuit, wherein the overlapped portion is defined by the common loop portion.

10. A voltage conversion device comprising:
    a first loop circuit that includes a first switching element; and
    a second loop circuit, wherein the first loop circuit and the second loop circuit include a common inductance element and a common loop portion having a noise reduction member arranged within the common loop portion, wherein the common loop portion includes a portion of the first and second loop circuits that overlap each other to define an overlapped portion, wherein
    electric current alternately flows through the first loop circuit or the second loop circuit as the first switching element is turned on or off,
    a magnetic field that is formed when the first switching element is turned on and that penetrates through the first loop circuit and a magnetic field that is formed when the first switching element is turned off after the first switching element is turned on and that penetrates through the second loop circuit having the same direction, and
    the area of an overlapped portion that is defined by the common loop portion between a portion surrounded by the first loop circuit and a portion surrounded by the second loop circuit is larger than or equal to the area of a non-overlapped portion within the portion surrounded by the first loop circuit or the portion surrounded by the second loop circuit, wherein the non-overlapped portion includes portions of the first and second loop circuits that do not overlap each other.

11. The voltage conversion device according to claim 10, wherein the first loop circuit includes a first capacitive element, and the second loop circuit includes a second capacitive element.

12. The voltage conversion device according to claim 10, wherein the second loop circuit includes a second switching element, and the first switching element and the second switching element are controlled so that one of the first switching element and the second switching element is turned on while the other one of the first switching element and the second switching element is turned off synchronously.

13. The voltage conversion device according to claim 11, wherein the first direct-current power source is connected to a median point between the first switching element and the first capacitive element in the first loop circuit.

14. The voltage conversion device according to claim 10, wherein
the first loop circuit includes a first capacitive element, and the second loop circuit includes a second capacitive element,
the second loop circuit includes a second switching element;
the first switching element and the second switching element are controlled so that one of the first switching element and the second switching element is turned on while the other one of the first switching element and the second switching element is turned off synchronously, and
the second direct-current power source is connected to a median point between the second switching element and the second capacitive element in the second loop circuit.

15. The voltage conversion device according to claim 10, wherein the first loop circuit and the second loop circuit are formed on a common substrate, and a magnetic substance is arranged within the overlapped portion in the substrate between a portion surrounded by the first loop circuit and a portion surrounded by the second loop circuit.

16. The voltage conversion device according to claim 10, wherein the first loop circuit and the second loop circuit are formed on a common substrate, and a metal fastening member for mounting the substrate on a casing component is arranged within the overlapped portion in the substrate between a portion surrounded by the first loop circuit and a portion surrounded by the second loop circuit.

17. The voltage conversion device according to claim 10, wherein the first loop circuit and the second loop circuit are formed on a common substrate, and a metal member for cooling the first switching element is arranged within the overlapped portion in the substrate between a portion surrounded by the first loop circuit and a portion surrounded by the second loop circuit.

18. The voltage conversion device according to claim 12, wherein the first loop circuit and the second loop circuit are formed on a common substrate, and a metal member for cooling the second switching element is arranged within the overlapped portion in the substrate between a portion surrounded by the first loop circuit and a portion surrounded by the second loop circuit.

19. A voltage conversion device comprising:
a first loop circuit that includes a first switching element; and
a second loop circuit, wherein the first loop circuit and the second loop circuit include a common inductance element, wherein
electric current alternately flows through the first loop circuit or the second loop circuit as the first switching element is turned on or off,
a magnetic field that is formed when the first switching element is turned on and that penetrates through the first loop circuit and a magnetic field that is formed when the first switching element is turned off after the first switching element is turned on and that penetrates through the second loop circuit having the same direction, and
a magnetic substance is arranged within an overlapped portion between a portion surrounded by the first loop circuit and a portion surrounded by the second loop circuit, wherein the overlapped portion includes a common loop portion having a portion of each of the first and second loop circuits that overlap each other,
wherein the first loop circuit and the second loop circuit are formed on a common substrate, and a metal fastening member for mounting the substrate on a casing component is arranged within the overlapped portion in the substrate between a portion surrounded by the first loop circuit and a portion surrounded by the second loop circuit.

20. The voltage conversion device according to claim 19, wherein the first loop circuit includes a first capacitive element, and the second loop circuit includes a second capacitive element.

21. The voltage conversion device according to claim 19, wherein the second loop circuit includes a second switching element, and the first switching element and the second switching element are controlled so that one of the first switching element and the second switching element is turned on while the other one of the first switching element and the second switching element is turned off synchronously.

22. The voltage conversion device according to claim 20, wherein the first direct-current power source is connected to a median point between the first switching element and the first capacitive element in the first loop circuit.

23. The voltage conversion device according to claim 19, wherein
the first loop circuit includes a first capacitive element, and the second loop circuit includes a second capacitive element,
the second loop circuit includes a second switching element,
the first switching element and the second switching element are controlled so that one of the first switching element and the second switching element is turned on while the other one of the first switching element and the second switching element is turned off synchronously, and
the second direct-current power source is connected to a median point between the second switching element and the second capacitive element in the second loop circuit.

24. The voltage conversion device according to claim 19, wherein the first loop circuit and the second loop circuit are formed on a common substrate, and a metal member for cooling the first switching element is arranged within the overlapped portion in the substrate between a portion surrounded by the first loop circuit and a portion surrounded by the second loop circuit.

25. The voltage conversion device according to claim 21, wherein the first loop circuit and the second loop circuit are formed on a common substrate, and a metal member for cooling the second switching element is arranged within the overlapped portion in the substrate between a portion surrounded by the first loop circuit and a portion surrounded by the second loop circuit.

26. A voltage conversion device comprising:
- a first loop circuit that includes a first switching element and a first capacitive element; and
- a second loop circuit that includes a second switching element and a second capacitive element, wherein the first loop circuit and the second loop circuit include a common inductance element, wherein
- electric current alternately flows through the first loop circuit or the second loop circuit as the first switching element is turned on or off,
- a first direct-current power source or a ground is connected to a median point between the first switching element and the first capacitive element in the first loop circuit,
- a second direct-current power source having a voltage different from a voltage of the first direct-current power source is connected to a median point between the second switching element and the second capacitive element in the second loop circuit, and
- the first loop circuit and the second loop circuit are arranged so that one of the first loop circuit and the second loop circuit surrounds the other one of the first loop circuit and the second loop circuit to have at least a portion of the other one of the first loop circuit and the second loop circuit inside the one of the first loop circuit and the second loop circuit.

27. The voltage conversion device according to claim 26, wherein the area of an overlapped portion between a portion surrounded by the first loop circuit and a portion surrounded by the second loop circuit is larger than or equal to the area of a non-overlapped portion within the portion surrounded by the first loop circuit or the portion surrounded by the second loop circuit, wherein the overlapped portion includes a common loop portion having a portion of each of the first and second loop circuits that overlap each other and the non-overlapped portion includes portions of the first and second loop circuits that do not overlap each other.

28. An electrical load driving device that drives an electrical load, comprising:
- a direct-current power source;
- the voltage conversion device according to claim 1, that converts the level of a voltage supplied from the direct-current power source and then outputs electric power to the electrical load; and
- a controller that controls the voltage conversion device.

29. An electrical load driving device that drives an electrical load, comprising:
- a direct-current power source;
- the voltage conversion device according to claim 10, that converts the level of a voltage supplied from the direct-current power source and then outputs electric power to the electrical load; and
- a controller that controls the voltage conversion device.

30. An electrical load driving device that drives an electrical load, comprising:
- a direct-current power source;
- the voltage conversion device according to claim 19, that converts the level of a voltage supplied from the direct-current power source and then outputs electric power the electrical load; and
- a controller that controls the voltage conversion device.

31. An electrical load driving device that drives an electrical load, comprising:
- a direct-current power source;
- the voltage conversion device according to claim 26, that converts the level of a voltage supplied from the direct-current power source and then outputs electric power to the electrical load; and
- a controller that controls the voltage conversion device.

* * * * *